(12) United States Patent
Tashiro et al.

(10) Patent No.: US 7,643,167 B2
(45) Date of Patent: Jan. 5, 2010

(54) DATA COMMUNICATION APPARATUS AND METHOD OF CONTROLLING SAME

(75) Inventors: Hirohiko Tashiro, Kawasaki (JP); Tokiya Fujihara, Yokohama (JP); Tomoki Sugahara, Ohta-ku (JP)

(73) Assignee: Canon Kabushiki Kaisha, Tokyo (JP)

(*) Notice: Subject to any disclaimer, the term of this patent is extended or adjusted under 35 U.S.C. 154(b) by 82 days.

(21) Appl. No.: 11/534,976

(22) Filed: Sep. 25, 2006

(65) Prior Publication Data

US 2007/0124421 A1 May 31, 2007

(30) Foreign Application Priority Data

Sep. 27, 2005 (JP) ............................. 2005-280104

(51) Int. Cl.
*G06F 3/12* (2006.01)
*H04N 1/00* (2006.01)
(52) U.S. Cl. ..................... 358/1.15; 358/400
(58) Field of Classification Search ................ 358/1.15
See application file for complete search history.

(56) References Cited

U.S. PATENT DOCUMENTS

| | | | | |
|---|---|---|---|---|
| 4,646,160 A * | 2/1987 | Iizuka et al. | ................. | 358/402 |
| 5,621,539 A * | 4/1997 | Brown et al. | ................. | 358/400 |
| 6,020,981 A * | 2/2000 | Ogiyama | ................. | 358/434 |
| 6,137,597 A * | 10/2000 | Kanaya | ................. | 358/402 |
| 6,388,772 B1 * | 5/2002 | Williams | ................. | 358/448 |
| 6,404,513 B1 * | 6/2002 | Denker | ................. | 358/407 |
| 7,072,079 B2 * | 7/2006 | Leung | ................. | 358/434 |
| 2002/0046217 A1 | 4/2002 | Kanazawa | | |
| 2002/0051146 A1 * | 5/2002 | Tanimoto | ................. | 358/1.9 |
| 2002/0099707 A1 * | 7/2002 | Matsumoto | ................. | 707/10 |
| 2003/0081234 A1 * | 5/2003 | Wiley | ................. | 358/1.13 |
| 2003/0117665 A1 * | 6/2003 | Eguchi et al. | ................. | 358/402 |
| 2003/0126318 A1 | 7/2003 | Nomura | | |
| 2003/0217178 A1 * | 11/2003 | Yoshimura et al. | ................. | 709/239 |
| 2004/0051912 A1 * | 3/2004 | Schlank et al. | ................. | 358/468 |
| 2005/0073665 A1 * | 4/2005 | Taniguchi et al. | ................. | 355/53 |
| 2005/0111054 A1 * | 5/2005 | Umeda | ................. | 358/453 |

FOREIGN PATENT DOCUMENTS

| | | | |
|---|---|---|---|
| EP | 1133156 A | | 9/2001 |
| EP | 1531610 A | | 5/2005 |
| EP | 1571823 A | | 9/2005 |
| JP | 05-130355 A | | 5/1993 |
| JP | 2000-270145 A | | 9/2000 |

* cited by examiner

*Primary Examiner*—Mark K Zimmerman
*Assistant Examiner*—Mesfin Getaneh
(74) *Attorney, Agent, or Firm*—Canon U.S.A., Inc. I.P. Division

(57) ABSTRACT

An image input/output system is used to input information for specifying the transmission source of data and a period of time during which the data should be received as search conditions for specifying the data that should be received. On the basis of the input conditions, the reception history of the data received via a network or a public network is read. The reception history is searched to determine whether the data that should be received has already been received. On the basis of the determination result, when the data that should be received has not been received, the fact that the data has not been received is reported.

18 Claims, 21 Drawing Sheets

FIG. 16

RECEPTION HISTORY MANAGEMENT

| TIME | THE OTHER PARTY 1601 | NAME 1602 | NUMBER 1603 | TYPE 1604 | NUMBER OF PAGES 1605 | RECEIVED RESULT 1606 1607 |
|---|---|---|---|---|---|---|
| 1/1 12:35 | 03-1111-1111 | A BRANCH | 01 | FAX | 1 | OK |
| 1/1 12:38 | 03-1111-2222 | B BRANCH | 02 | FAX | 1 | OK |
| 1/1 12:43 | 03-1111-3333 | C BRANCH | 03 | FAX | 1 | OK |
| 1/1 12:44 | abcdef@abc.co.jp | A BRANCH | 04 | IFAX | 5 | OK |
| 1/1 12:59 | 03-1111-6666 | F BRANCH | 05 | FAX | 1 | OK |
| | | | | | | |
| | | | | | | |
| | | | | | | |
| | | | | | | |
| | | | | | | |

FIG. 18

POLLING RECEPTION SETTING

- THE OTHER PARTY NUMBER: 03-1111-2222  (1810)
- PASSWORD: ****  (1820)
- ● TIME SPECIFIED: 17:00  (1830, 1831)
- ○ PERIOD OF TIME SPECIFIED  (1840)
  - ☑ REPEATED EVERYDAY  (1841)
  - ☐ EVERY ONE HOUR
  - ☐ EVERY 5 HOURS
  - ☐ EVERY 10 HOURS
  - ☐ EVERY OTHER DAY
  - ☐ EVERY THREE DAYS
  - ☐ EVERY OTHER WEEK
- ○ NO TIMER  (1850)
- ☑ REPORT WHEN THERE IS NO DATA: abcdef@abc.co.jp  (1860)
- ☑ REPORT TO THE OTHER PARTY NUMBER  (1861)

[ OK ] (1870)   [ CANCEL ] (1880)

POLLING RECEPTION ERROR REPORT

Transmission source number   03-1234-5678
Transmission source name     Main office
Document requested           Daily sales report of A branch The Receiver 03-1234-5678 tried to perform polling reception of the above-identified document, but could not receive the document due to the reasons described below.
Please confirm.

Error status:    The data of the specified document name could not been found.

DATA COMMUNICATION APPARATUS AND METHOD OF CONTROLLING SAME

BACKGROUND OF THE INVENTION

1. Field of the Invention

The present invention relates to a data communication apparatus for receiving data via a network and to a method of controlling the data communication apparatus.

2. Description of the Related Art

Technology for notifying information on reception of data in a data communication apparatus capable of communicating with external devices has been known. For example, a facsimile apparatus in which reception of a personal document containing a personal ID sent from another facsimile apparatus, which is an external device, is notified by sending electronic mail to a mail address corresponding to the personal ID contained in the received personal document, has been known (Japanese Patent Laid-Open No. 2000-270145).

Furthermore, a facsimile apparatus in which, for example, unsuccessful reception of a document sent from another facsimile apparatus, which is an external device, is notified to the facsimile apparatus that is the transmission source, has been known (Japanese Patent Laid-Open No. 1993-130355).

However, there is a case in which, for example, a data communication apparatus is scheduled to receive a particular document during a specified reception period (for example, at a predetermined time) from an external device. In this case, when the document to be received has not been received within the specified reception period, the recipient has to confirm whether or not the document has been received by operating the apparatus, which is troublesome. Furthermore, when a user who should transmit a document forgets to transmit it, there is a problem in which a user on the reception side has to inform the user on the transmission side that the user on the transmission side has forgotten to transmit the document.

There is a case in which, for example, a data communication apparatus requests an external apparatus to transmit a document and receives the document transmitted from to the external apparatus. In this case, when the document is not successfully transmitted from the external apparatus in spite of the fact that the request for the transmission of the document is made, it is necessary for a user on the reception side to make an inquiry regarding the unsuccessful transmission to a user on the transmission side, which is troublesome.

SUMMARY OF THE INVENTION

The present invention provides a data communication apparatus and a method of controlling the data communication apparatus, which overcomes or at least mitigates one or more of the above-described problems.

According to an aspect of the present invention, a data communication apparatus is provided which includes a reception unit configure to receive data from a plurality of transmission sources; an input unit configured to input at least transmission source specification information for specifying the transmission source of at least one of expected data and reception period-of-time specification information for specifying a period of time during which the expected data should be received, as conditions for specifying the expected data that should be received from among the other data received by the reception unit; a determination unit configured to determine whether or not the reception unit has received the expected data corresponding to the conditions input by means of the input unit; and an output unit configured to output non-reception information indicating that the reception unit has not received the expected data as a result of the determination result by the determination unit.

According to another embodiment of the present invention, a data communication apparatus is provided which includes a reception unit configured to receive data from a plurality of transmission sources; an input unit configured for inputting at least transmission source specification information for specifying the transmission source of the data as conditions for specifying expected data that should be received from among the other data received by the reception unit; a transmission request unit configured to request a party specified by the transmission source specification information input by the input unit to transmit data; and an output unit configured to output information indicating that the expected data cannot be received when the party for which the transmission of data has been requested by the transmission request unit is not in a state of capable of transmitting the expected data.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principle of the invention.

FIG. 16 shows a reception history table according to an exemplary embodiment of the present invention.

FIG. 18 shows a polling reception setting screen according to an exemplary embodiment of the present invention.

FIG. 21 shows a facsimile image for report purposes according to an exemplary embodiment of the present invention.

DESCRIPTION OF THE EMBODIMENTS

Embodiments, features and aspects of the present invention will now herein be described, by way of example only, with reference to the accompanying drawings.

First Exemplary Embodiment

Figure 1:
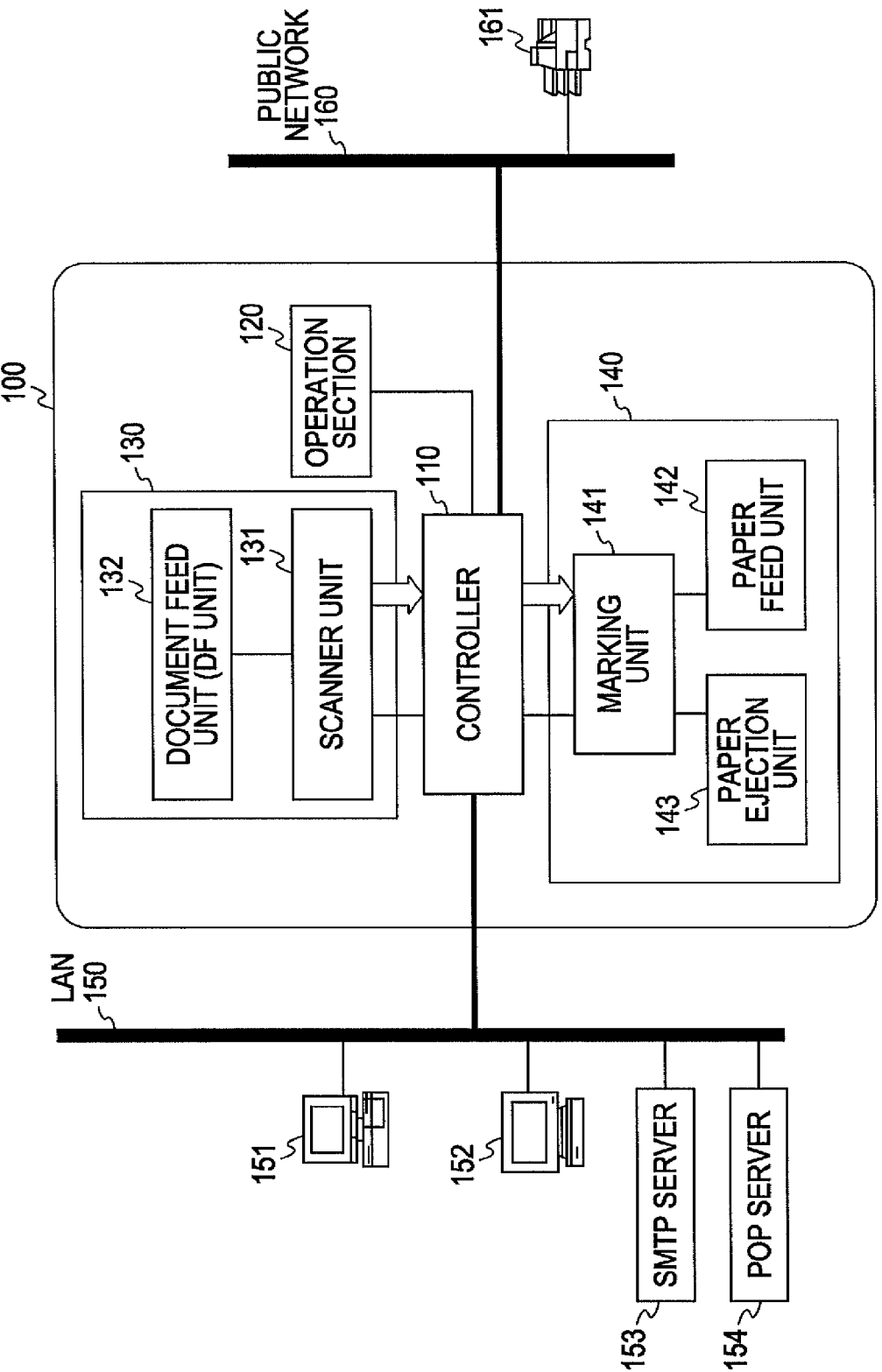
FIG. 1 is a block diagram showing the overall configuration of a data input/output system according to an exemplary embodiment of the present invention.

FIG. 1 shows the overall configuration of a data input/output system 100 according to an exemplary embodiment of the present invention.

A reader device 130 reads an image on an original document and converts it into image data. The reader device 130 includes a scanner unit 131 having a function of reading an image on an original document, and a document paper feed unit 132 having a function of feeding document printing paper. A printer device 140 feeds recording paper and prints image data thereon. The printer device 140 includes a paper feed unit 142 having a paper feed cassette capable of storing a plurality of types of recording paper; a marking unit 141 having functions for transferring and fixing image data on recording paper; and a paper ejection unit 143 having functions of sorting, stapling, and ejecting printed recording paper.

A control device 110 is connected to the reader device 130 and the printer device 140, and is also connected to external devices via a network. More specifically, the control device 110 is connected to PCs 151 and 152 via a LAN 150 and is further connected to a facsimile apparatus 161 via a public network 160.

The control device 110 provides copying functions by controlling the reader device 130 to read an image on an original document, and controlling the printer device 140 to print image data. Furthermore, the control device 110 provides scanner functions by controlling that image data read by the reader device 130 is converted into code data, and it is transmitted to the PC 151 or 152 via the LAN 150. Furthermore, the control device 110 provides printer functions by converting code data received from the PC 151 or 152 via the LAN 150 into image data and by printing and outputting it from the printer device 140.

Furthermore, the control device 110 is capable of receiving electronic mail to which image data in a facsimile format is attached from the PC 151 or 152 via the LAN 150 by using an Internet facsimile (IFAX) function. At this time, the PCs 151 and 152 transmit electronic mail to an SMTP (Simple Mail Transfer Protocol) server 153 by using SMTP. Then, the SMTP server 153 transfers the electronic mail to a POP3 (Post Office Protocol Version 3) server 154 specified by an electronic mail address.

When the control device 110 is to receive electronic mail by using an Internet facsimile function, the control device 110 receives electronic mail stored in a POP3 server 154 by using POP3. At this time, the control device 110 may receive electronic mail by using SMTP.

Furthermore, the control device 110 can receive facsimile data from the facsimile apparatus 161 via the public network 160. When receiving facsimile data, the control device 110 uses a communication protocol for G3 facsimile, which is specified in the ITU-T recommendation T.30.

An operation section 120 is connected to the control device 110 and is formed of a liquid-crystal touch panel, or the like, and a plurality of hard keys. The operation section 120 provides a user interface for a user to operate the data input/output system 100.

Figure 2:
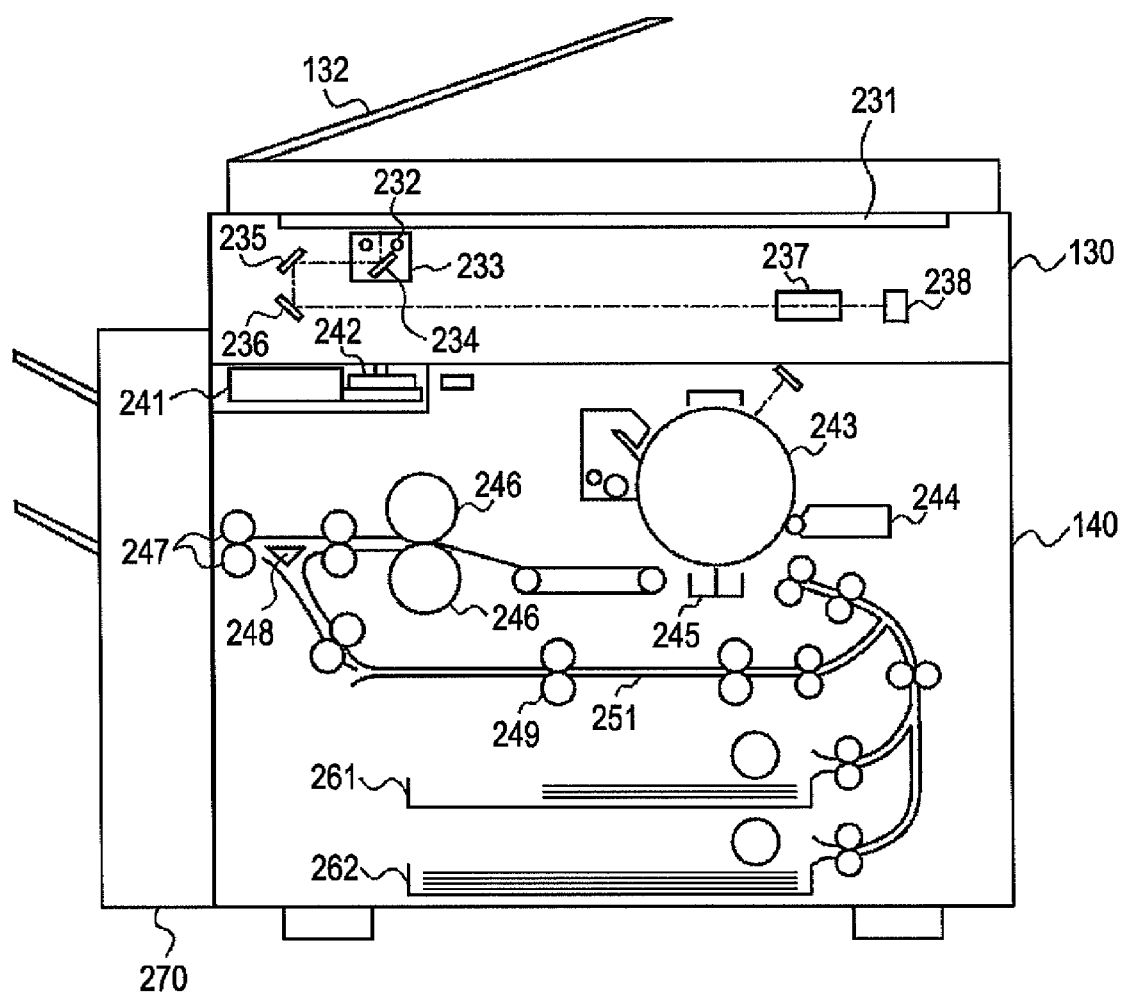
FIG. 2 is an exterior view of a reader device and a printer device according to an exemplary embodiment of the present invention.

FIG. 2 shows an exterior view of an exemplary combined machine 100, which is an image input/output system, in which the reader device 130, the printer device 140 and an output section 270 are integrally configured. The reader device 130 is installed with a document paper feed unit 132. The document paper feed unit 132 sequentially feeds the sheets of paper of the document one by one from the start onto a platen glass 231, and ejects each sheet of paper of the document from the platen glass 231 into an ejection tray (not shown) each time the operation for reading each sheet of paper of the document is completed.

When each sheet of paper of the document is fed onto the platen glass 231, the reader device 130 lights up a lamp 232 and a movement unit 233 begins to move. As a result of the movement of the movement unit 233, scanning of the sheet of paper of the document on the platen glass 231 is performed. During this scanning, the light reflected from the sheet of paper of the document passes through mirrors 234, 235, and 236, and a lens 237, and is guided to a CCD or other image sensor (hereinafter referred to as a "CCD") 238, so that the image on the sheet of paper of the original document is formed into an image on the image plane of the CCD 238. The CCD 238 converts the image formed on the image plane into an electrical signal, and after predetermined processing is performed on the electrical signal, it is input to the control device 110.

The printer device 140 includes a laser driver 241. The laser driver 241 drives a laser light-emission section 242 on the basis of the image data input from the control device 100. As a result, laser light corresponding to the image data is emitted from the laser light-emission section 242, and the laser light is irradiated onto a photo-sensitive drum 243 while being scanned. On the photo-sensitive drum 243, an electrostatic latent image is formed by the irradiated laser light, and the electrostatic latent image is formed into a visual image as a toner image by means of toner supplied from a developer 244. Furthermore, recording paper is fed between the photo-sensitive drum 243 and a transfer section 245 from each of the paper feed cassettes 261 and 262 through a feeding path, and the toner image on the photo-sensitive drum 243 is transferred onto the fed recording paper in the transfer section 245.

The recording paper on which the toner image is transferred is sent to a fixing roller pair (a heating roller and a pressure roller) 246 via a feeding belt. The fixing roller pair 246 heat-pressurizes the recording paper and fixes the toner image on the recording paper onto the recording paper. The recording paper passed through the fixing roller pair 246 is ejected into the paper ejection unit 143 by a paper ejection roller pair 247. The paper ejection unit 143 is formed of a sheet processing device capable of performing processing, such as sorting and stapling.

When a both-sides recording mode is set, the recording paper is fed to the paper ejection roller pair 247, and thereafter, the rotation direction of the paper ejection roller pair 247 is reversed, and the recording paper is guided to a paper refeeding path 251 by a flapper 248 and roller pair 249. The recording paper guided into the paper refeeding path 251 is fed again between the photo-sensitive drum 243 and the transfer section 245, and a toner image is transferred onto the rear surface of the recording paper.

Figure 3:
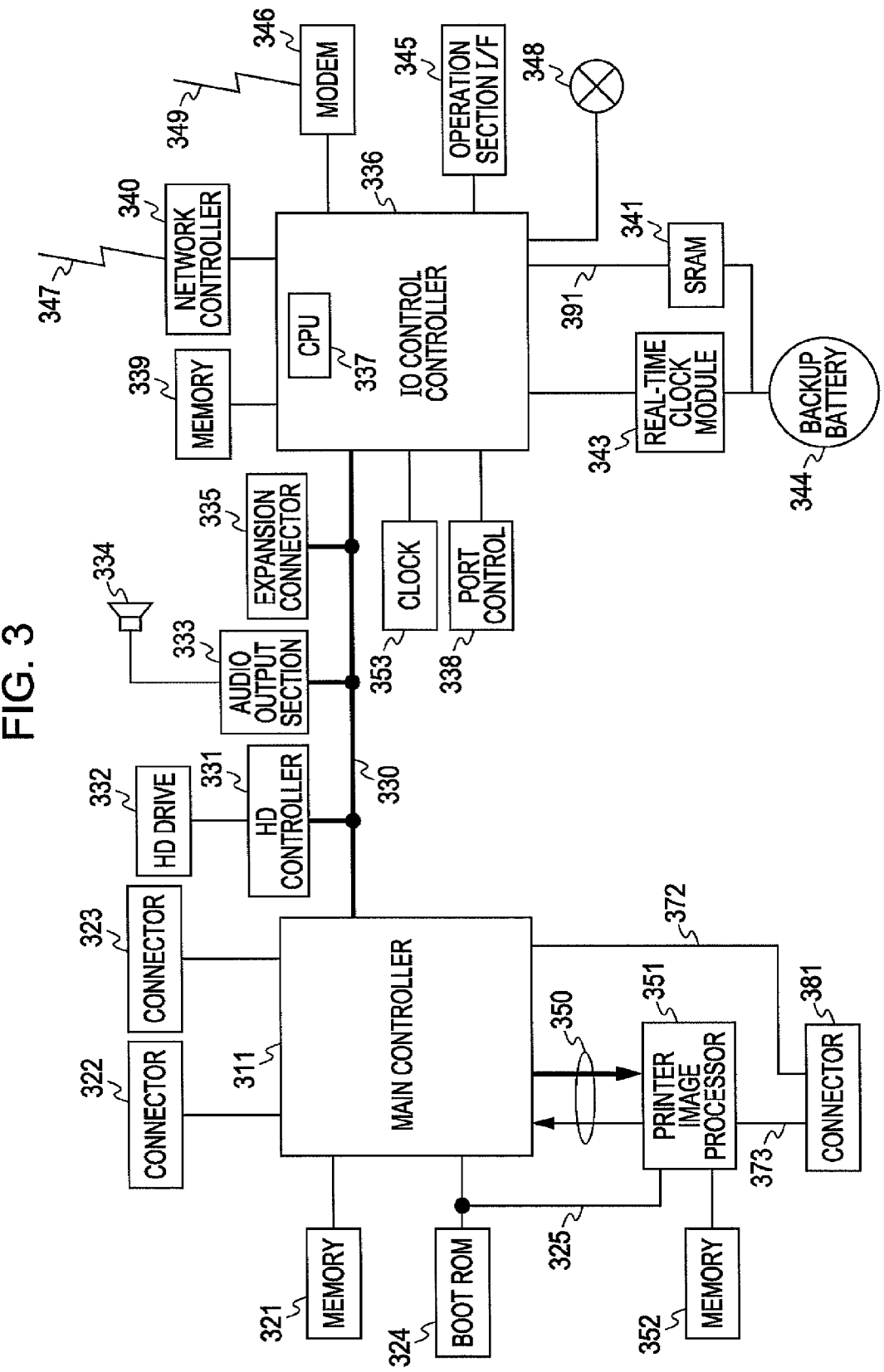
FIG. 3 is a block diagram of a control device according to an exemplary embodiment of the present invention.

FIG. 3 is a system block diagram illustrating an exemplary control device 110. A main controller 311 includes a CPU (Central Processing Unit), a rendering section, a memory controller, a serial communication control section, a serial bus control section, and the like.

A CPU 337, which controls the operation of the entire control device 110, reads and performs programs stored in memory 321. An operation for interpreting PDL (Page Description Language) data received from the PC 151 or 152 and for developing the PDL data into raster image data is provided by this program. The interpretation of the received code data is performed by the CPU 337, and the development of the raster image data is processed by the rendering section.

In the rendering section, on the basis of the code data generated by the CPU 337, raster image data is generated, and the raster data, after development, is transferred to the memory 321 and the printer image processor 351. Examples of color spaces for image data generated by the rendering section include RGB and CMYK.

The serial communication control section performs communication with the CPU of the printer device 140 by transmitting and receiving a control command via a serial bus. In the serial bus control section, communication with a host computer and communication with various kinds of devices are performed via a connector 322. General examples of a serial bus include USB (Universal Serial Bus). The serial bus is used as an interface for receiving PDL data from the host computer.

The serial bus is connected to a connector 323, and is used to transfer image data. A boot ROM 324 has stored therein a program to be started up by the CPU 337, and in some cases, font data for PDL is stored therein. A clock 353 counts the current time.

An expansion connector 335 (to which an expansion board is connected), an I/O (Input/Output) control controller 336, an HD (hard disk) controller 331, an audio output section 333, and the like are connected to a general-purpose high-speed bus 330. General examples of a general-purpose high-speed bus include a PCI (Peripheral Component Interconnect) bus.

The HD controller 331 is an interface for connecting a large-capacity external storage device. In the first embodiment, an HDD (hard disk drive) 332 is connected via the HD controller 331. The HDD 332 is used as a storage device for storing programs or for storing read or received image data.

The I/O control controller 336 performs control of a data bus 391. Furthermore, the CPU 337 is installed in the I/O control controller 336, so that control of a port controller 338 is performed, communication with a network controller 340 and the operation section 120 is performed, and communication with a modem 346 is controlled.

The network controller 340 is connected to an external network 347. At this time, general examples of an external network include Ethernet (registered trademark). The external network is used for remote management for receiving PDL data from an external PC, for transmitting images read by the reader device 130, and for managing terminals via the network. Wireless interface unit 348 is connected to a wireless network (not shown).

The modem 346 is connected to a public network 349, which is an external network, and performs facsimile communication. A memory 339 is a work memory for the CPU 337 and is also used as a work memory for image data to be displayed on the operation section 120. Furthermore, the memory 339 stores history information regarding the transmission and reception of data communicated with the external devices. The history information stored by the memory 339 is read in response to a request from the external apparatus or the operation section 120, is displayed on the operation section 120, is printed by the printer device 140, or is transmitted to an external device via each interface.

An audio output section 333 is used to output an audio signal, and outputs a signal to a speaker 334 on the basis of data input from the general-purpose high-speed bus 330.

An operation section interface 345 is an interface for performing display on a liquid-crystal touch panel of the operation section 120, and is formed of a key input interface for making inputs of the hard keys and the touch panel keys on the operation section 120. A signal input by means of the liquid-crystal touch panel or the hard key on the operation section 120 is transmitted, to the CPU 337. This signal takes the form of an ID number of the hard key input via the operation section interface 345 or the input coordinate information of the touch panel. On the liquid-crystal touch panel, image data, function information, and the like, which are transmitted via the operation section interface 345, are displayed.

An SRAM 341 is backed up by a backup battery 344, is capable of registering user modes and various kinds of setting information, and stores the file management information of the hard disk drive 332, etc. A real-time clock module 343 is used to update/store the date and the time managed within the apparatus and is backed up by a backup battery 344.

A printer image processor 351 is connected to the main controller 311 by a custom bus 325 and a high-speed bus 350. The high-speed bus 350 is connected in a ring form by one-way communication. The printer image processor 351, which is connected to the printer device 140 via a connector 381, performs predetermined image processing on the image data input from the main controller 311, and outputs the image data to the main controller 311 or the printer device 140. A communication path 372 is provided between the main controller 311 and the connector 381, while another communication path 373 is provided between the printer image processor 351 and the connector 381. A memory 352 is used as a work area and a delay buffer of the printer image processor 351.

Figure 4:
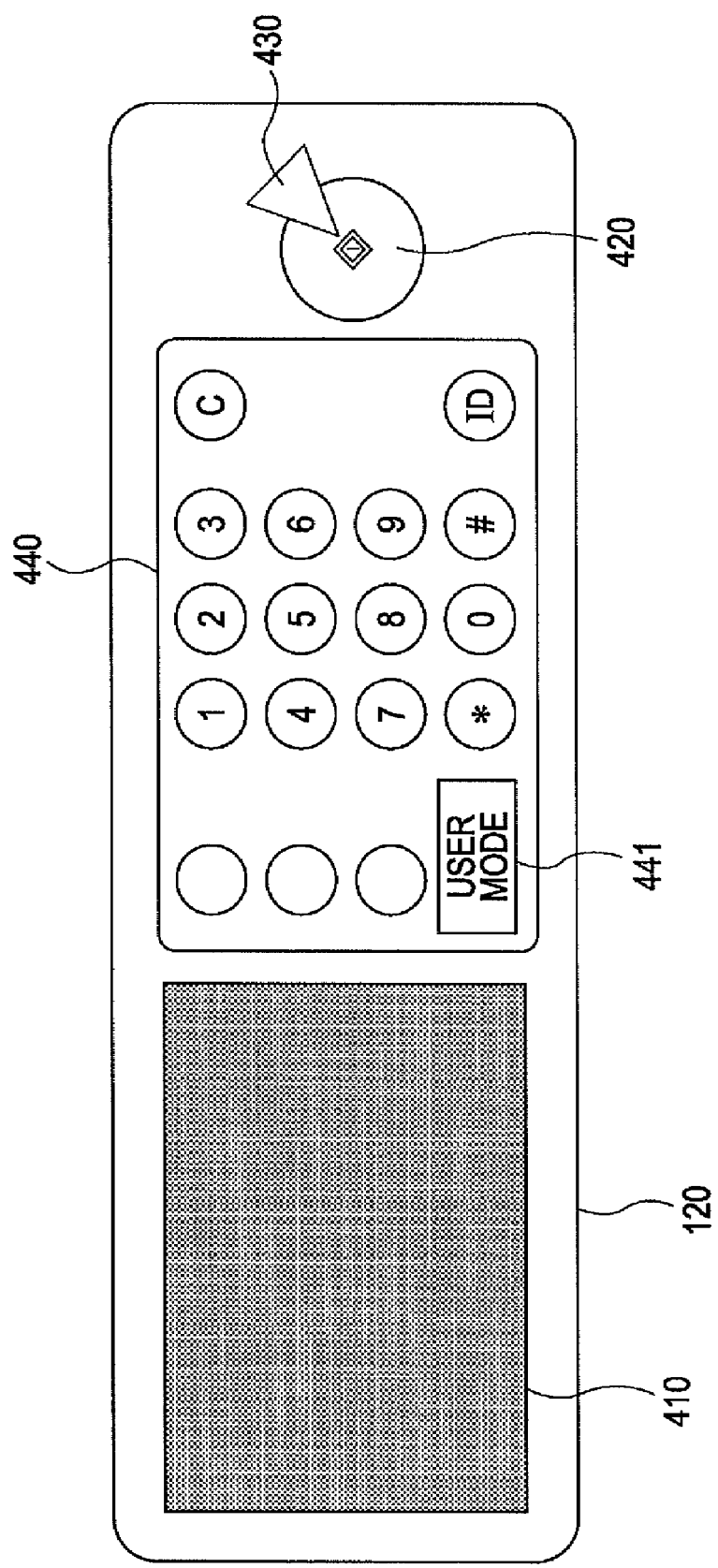
FIG. 4 is an overall view of an operation section according to an exemplary embodiment of the present invention.

FIG. 4 shows an exterior view of an exemplary operation section 120. In a liquid-crystal touch panel 410, a touch panel sheet is bonded onto a liquid-crystal panel. An operation screen of the image input/output system is displayed, and when a displayed key is depressed, the information of the position thereof is transmitted to the CPU 337 of the control device 100. A start key 420 is used when the operation for reading a document image is to be started. In the central portion of the start key, there are LEDs of two colors, that is, green and red, and the color indicates whether or not the start key can be used. A stop key 430 functions to stop the operation in progress.

A hard key group 440 is provided with a ten-key pad, a clear key, a reset key, a guide key, a user mode key, and an ID key. The ID key is used when the user ID of a user is to be input. The reset key is used when setting from the operation section 120 is to be initialized. The user mode key (441) is used when various kinds of setting are to be performed in a user mode.

The functions provided by the combined machine 140 according to the first embodiment are classified into four large modes, that is, copy, transmission/facsimile, box, and remote scanner. They correspond to four main tabs 501 to 504 displayed in the upper portion of the exemplary operation screen shown in FIG. 5. As a result of selecting one of these main tabs, switching to the operation screen of each mode is performed.

The "copy" mode is a mode in which a copying process is performed by using the reader device 130 and the printer device 140. The "transmission" mode is a mode in which electronic mail transmission, file transfer, and box storage, or database transfer of image data is performed. At this time, it is also possible to specify a plurality of destinations of the image data. In the "facsimile" mode, transmission and reception of facsimile data is performed. It is also possible to perform polling communication of facsimiles.

The "box" mode is a mode in which data read by the reader device 130, data received by a facsimile, or data that is received from an external PC and that is developed into PDL data is stored in a storage device such as the HDD 332. It is possible to read data stored in the box, to print it, and transmit it. The "remote scanner" mode is a mode in which an image is read in response to instructions from an external PC, etc., and the read image data is distributed to the external PC, which is the request source.

A unique key ID is assigned to each of the buttons and the hard key group displayed on the operation screen. When key input is accepted, processing, such as screen switching or setting, is performed on the basis of each piece of key ID information. Vibration setting information and audio output information are assigned to the key ID.

A method for setting the functions described above will be described below by using an example of a screen displayed on a liquid-crystal touch panel section.

[Exemplary Copy Screen]

Figure 5:
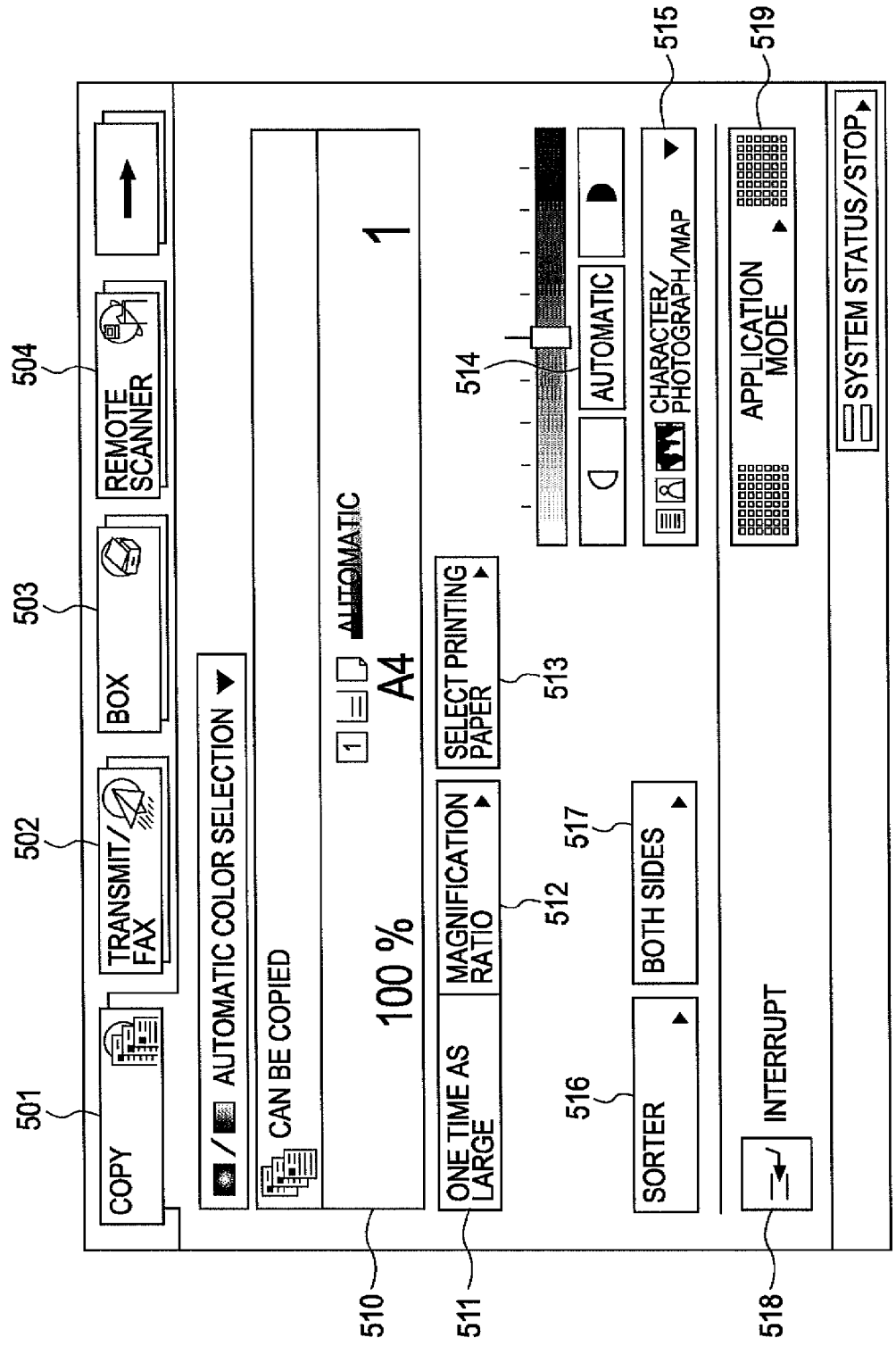
FIG. 5 shows a copy of a basic screen of the operation section according to an exemplary embodiment of the present invention.

When the start button is depressed when the copy basic screen is to be displayed, the reader device 130 operates, and a copied object corresponding to each of setting parameters displayed on the screen is output from the selected printer. FIG. 5 shows a copy basic screen. The copy basic screen includes an expansion/reduction setting button 511/512, a printing paper select button 513, a copy conditions display area 510, a sorter setting button 516, a both-sides copy setting button 517, a density setting button 514, a character/photograph setting button 515, an interrupt button 518, an application mode setting button 519, etc.

When one of the various kinds of the copy parameter setting buttons 511 to 517 is selected, a subscreen (expansion/reduction setting, printing paper selection, density setting, sorter setting, both-sided copy setting, and character/photograph setting) corresponding to the copy parameter setting button is displayed, making it possible to set a parameter.

Figure 6:
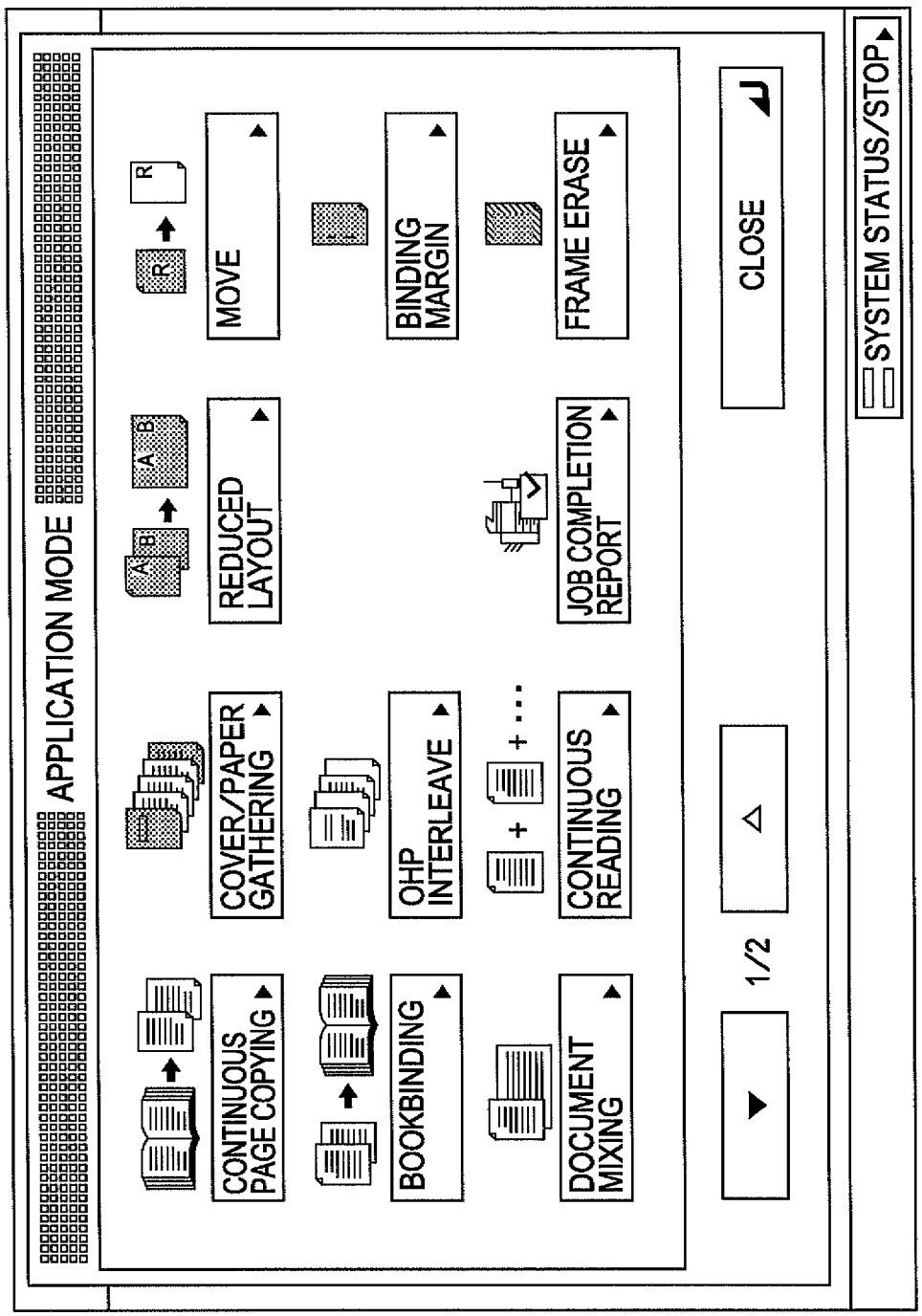
FIG. 6 shows a copy of an application mode screen of the operation section according to an exemplary embodiment of the present invention.

When the application mode setting button 519 is selected, as shown in FIG. 6, function setting buttons, such as for continuous page copying and reduced layout, is displayed. When these function setting buttons are selected, a subscreen corresponding to each of the function setting buttons is displayed, making it possible to set a parameter for various application modes.

[Exemplary Transmission/Facsimile Screen]

When the start button is depressed while the transmission/facsimile basic screen is displayed, the reader device 130 operates, and a process for transmitting read image data to a destination that is specified in advance by the user by using a specified transmission method is started.

Figure 7:
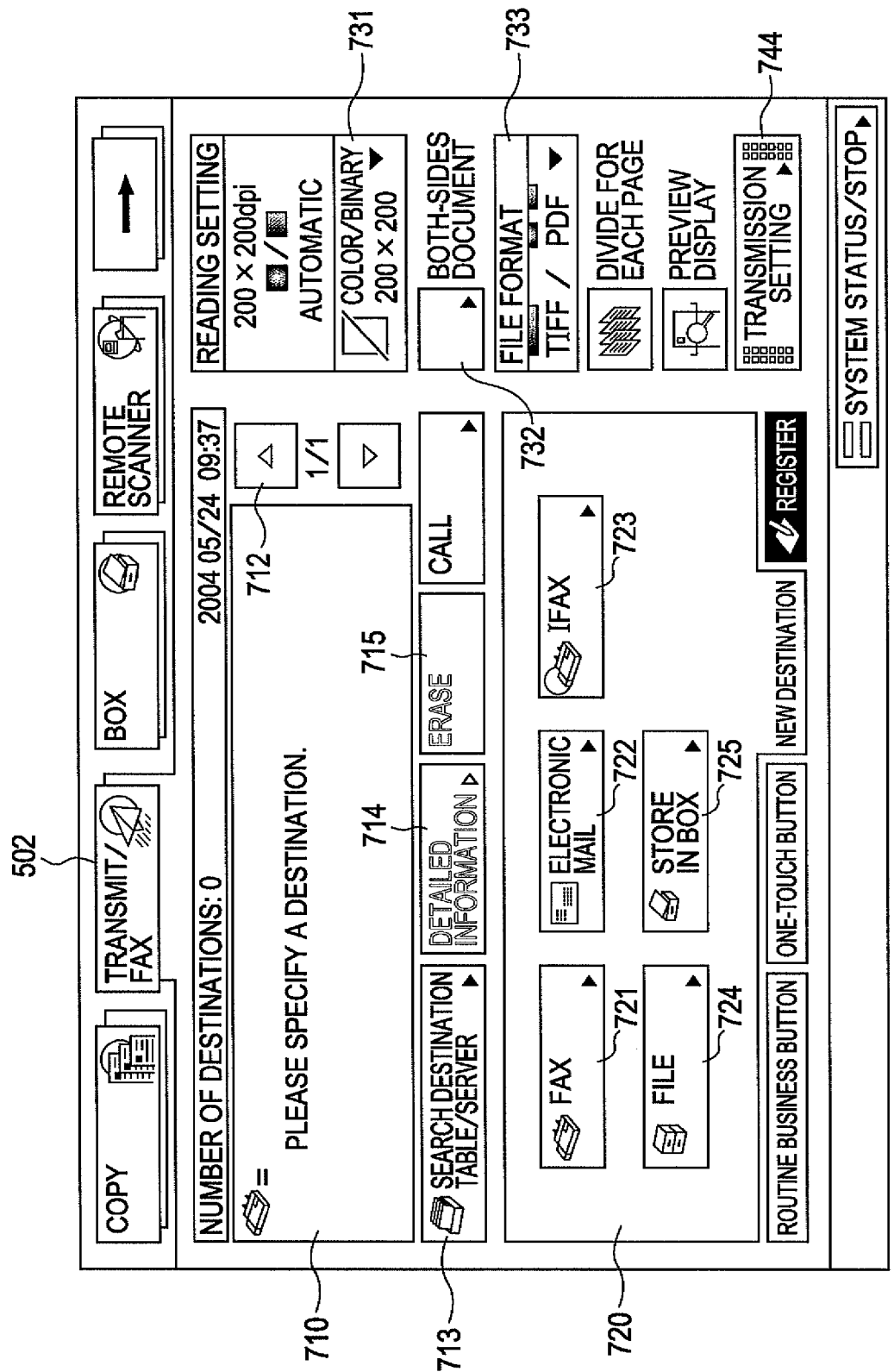
FIG. 7 shows a transmission/facsimile basic screen of the operation section according to an exemplary embodiment of the present invention.

FIG. 7 shows an exemplary transmission/facsimile basic screen which appears when the transmit/fax tab 502 is selected. The transmission/facsimile basic screen includes a destination display area 710, a destination scroll button 712, an address book button 713, display area 720 include transmission method select buttons 721 to 725, an editing button 714, a delete button 715, a transmission setting button 744, a reading setting button 731, both side document setting button 732, file format setting button 733 and the like. During initialization including resetting, as shown in FIG. 7, no one destination is displayed in the destination display area, and an operation illustration screen is displayed.

A list of specified destinations is displayed in the destination display area 710. The input is sequentially added to the end. After a particular destination is selected from the destination display area, when the delete button 715 is depressed, the selected destination is deleted.

When the transmission setting button 744 is selected, an input screen for inputting a subject name, a message or the like is displayed. When the address book button 713 is selected, the address book subscreen is displayed, making it possible to select a transmission destination from among the registered transmission destinations.

When the transmission method select buttons 721 to 725 corresponding to the transmission methods (electronic mail, facsimile, IFAX (Internet facsimile), file transfer, and box storage) are selected, their respective detailed subscreens are displayed, making it possible to set a new destination.

When the reading setting button 731 is selected, a reading setting subscreen is displayed, so that pre-set resolutions, scanning modes, and densities are displayed and can be selected. These values can also be freely set in manual operation.

When the facsimile button 721 is selected, facsimile transmission and facsimile reception are possible. When polling reception is to be performed, by depressing a polling setting button displayed after the facsimile button 721 is depressed, a polling reception setting screen (to be described later with reference to FIG. 18) is displayed, and conditions for performing polling reception are set.

[Exemplary Box Screen]

The box basic screen is used when image data read by the reader device 130 is stored in a box specified by the user and when setting of printing/transmitting the image data stored in the box is performed. The box refers to a storage area allocated within the HDD 332.

Figure 8:
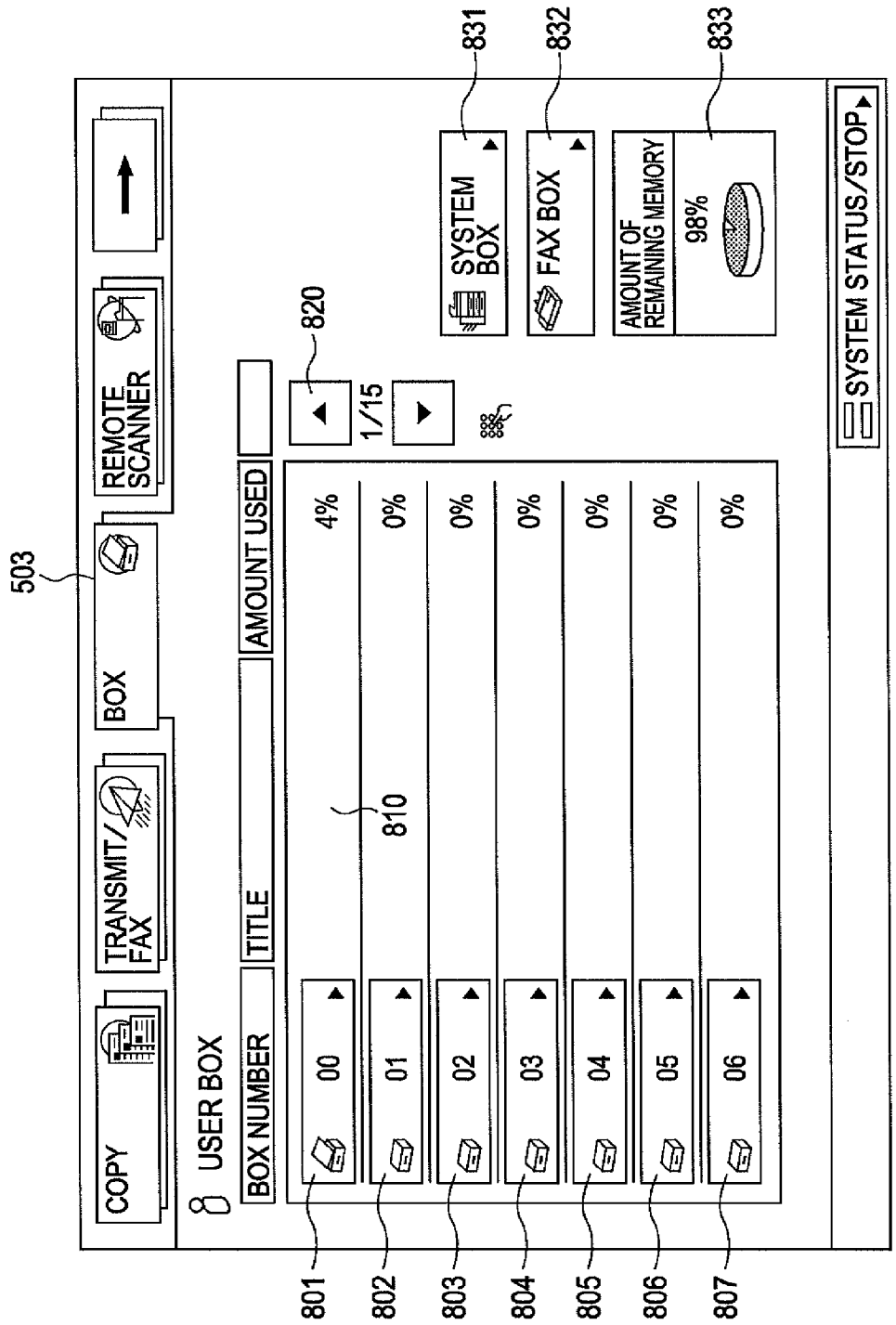
FIG. 8 shows a box basic screen of the operation section according to an exemplary embodiment of the present invention.

FIG. 8 shows an exemplary box basic screen which is displayed when the box tab 503 is selected. The box basic screen includes box select buttons 801 to 807, a box scroll button 820, a system box button 831, a facsimile box button 832, an amount-of-remaining-memory display area 833, and a box name display area 810.

Figure 9:
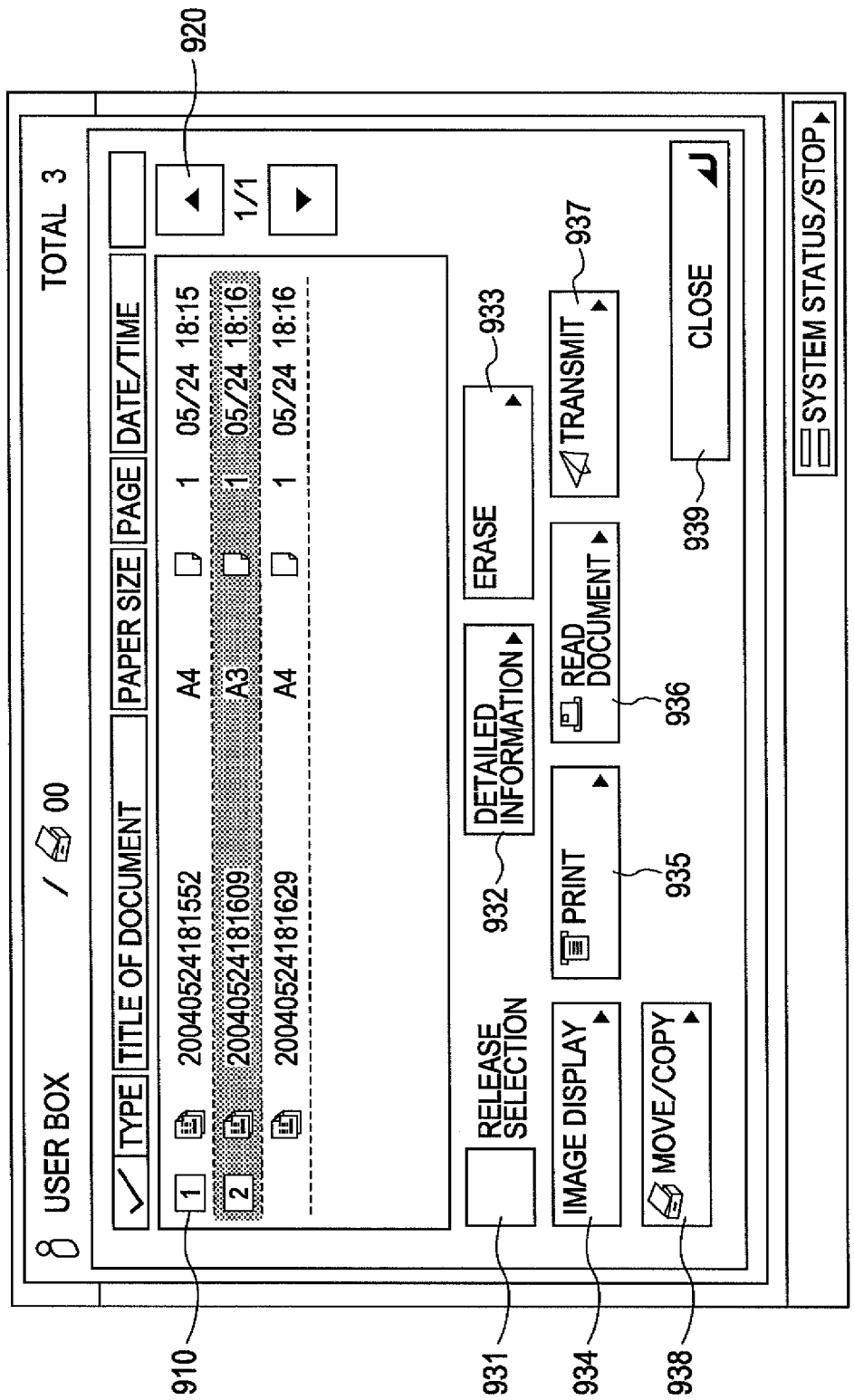
FIG. 9 shows a user box subscreen of the operation section according to an exemplary embodiment of the present invention.

When the box select buttons 801 to 807 are selected, an user box subscreen shown in FIG. 9 is displayed. When the box scroll button 820 is selected, the displayed box number scrolls. When the system box button 831 is selected, a system box subscreen is displayed, and a list of received document data is displayed. When the facsimile box button 832 is selected, a facsimile box subscreen is displayed. In the facsimile box, fax-received document data is stored. When the box select button displayed on the facsimile box subscreen is selected, a list of stored documents is displayed. In the amount-of-remaining-memory display area 833, an available capacity of the storage area of the documents stored in the HD drive 332 is displayed. In the box name display area 810, names set in each box are displayed.

FIG. 9 shows an exemplary user box subscreen. The user box subscreen includes a stored document display area 910, a select button 931, an image display button 934, a detailed display button 932, a delete button 933, a print button 935, a document read button 936, and a close button 939.

In the stored document display area 910, a list of stored documents is displayed. When a desired document is selected, a check mark is displayed on the left side. When the display scroll button 920 is depressed, the display screen scrolls. The select button 931 serves the function of all-document selection when no document is selected and the function of selection release when a document is selected. When the image display button 934 is selected, the image of the document currently being selected is preview-displayed on the screen.

When the copy-and-move document button 938 is selected, a copy-and-move document subscreen is displayed, making it possible to move the selected document to another box. When the detailed display button 932 is selected, the detailed setting of the document being currently selected is displayed. When the delete button 933 is selected, the selected document is deleted from the box. When the print button 935 is selected, a print subscreen is displayed, and a selected document can be printed.

When the document read button 936 is selected, a document reading subscreen is displayed, and thus document reading setting can be performed. When the start key 420 is depressed while the document reading subscreen is being displayed, the reader device 130 reads an image on the document and stores it in a box. Not only input from the reader device 130, but also PDL raster data can be stored in the specified box from an external apparatus such as the PC 151 or 152.

When the transmission button 937 is selected, a transmission subscreen is displayed, making it possible to transmit a selected document to a specified destination. When the close button 939 is selected, the screen returns to the box basic screen (FIG. 8).

Next, a description will be given of a function for detecting whether or not specified data has been received with respect to the data received via a network, such as the LAN 150 and the public network 160. In the first embodiment, whether or not specified data has already been received is determined by referring to a reception history table shown in FIG. 16 (to be described later), which is stored in the memory 339.

Figure 10:
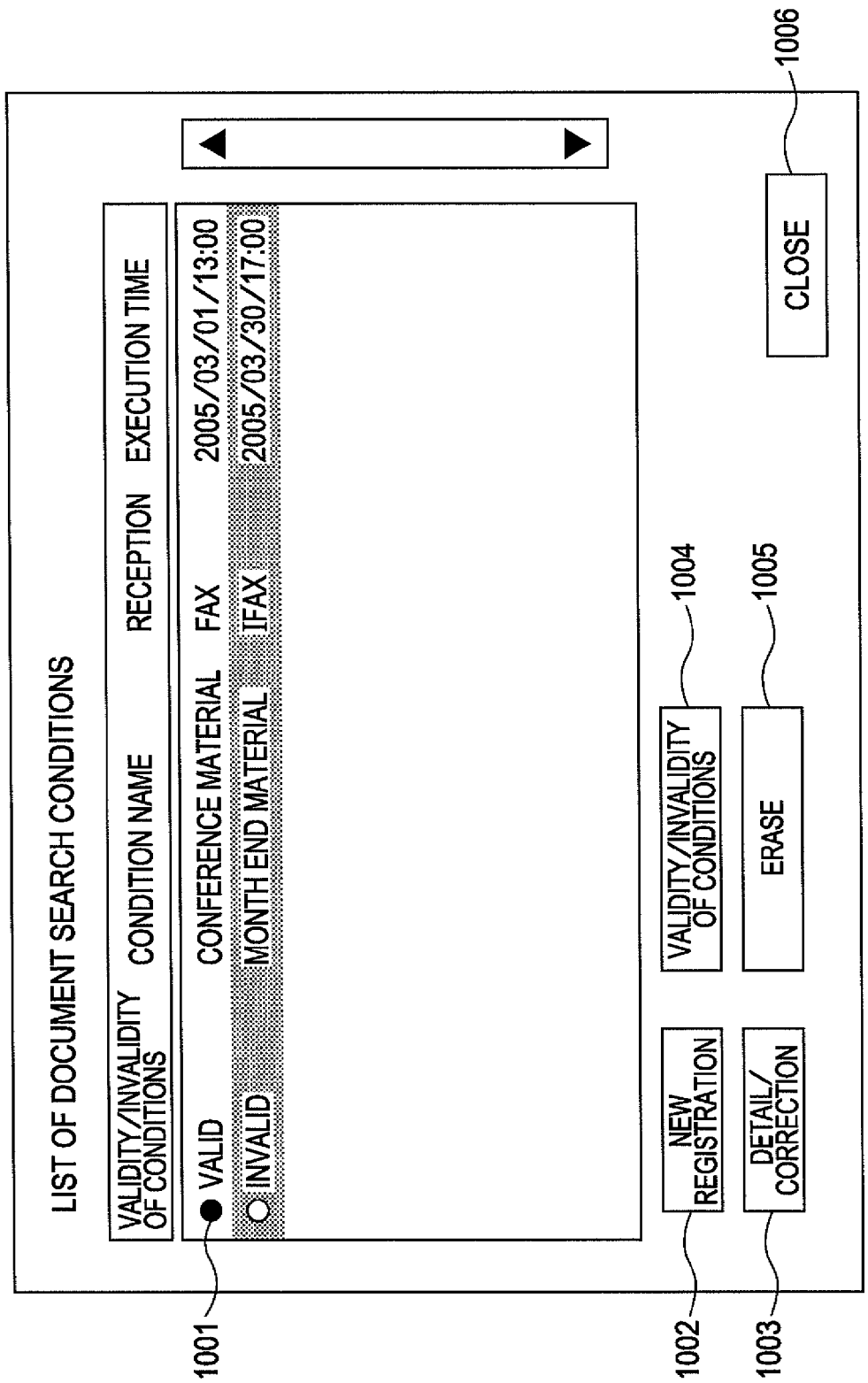
FIG. 10 shows a search conditions list screen according to an exemplary embodiment of the present invention.

FIG. 10 shows an exemplary search conditions list screen for displaying a list of search conditions that are set to confirm the reception of specific reception data by searching the reception history. The search conditions list screen is displayed when a conditions setting button is depressed on the screen displayed when the user mode button 441 shown in FIG. 4 is depressed.

The search conditions list screen includes a registration conditions display area 1001, a new registration button 1002, a detailed display/correction button 1003, a validity/invalidity button 1004, a delete button 1005, a close button 1006, and the like. In the registration conditions display area 1001, a list of search conditions that are currently registered is displayed. The displayed items shows whether or not the search based on the respective current search conditions is valid/invalid, and also the condition item name, the reception method, and the search start time.

When the new registration button 1002 is depressed, a search conditions setting screen for newly setting search conditions is displayed. When the correction button 1003 is selected, a search conditions correction screen for performing detailed display/correction of the registered conditions is displayed. When the validity/invalidity button 1004 is depressed in a state in which at least one of the search conditions in the list is selected, the setting of the validity/invalidity of the conditions selected each time the validity/invalidity button 1004 is depressed can be changed. As a result, when the search conditions that have become unnecessary temporarily and become necessary again, there is no need to newly register them. Thus, if they are registered once, they can easily be set again. The selected conditions can be deleted by depressing the delete button 1005.

Figure 11:
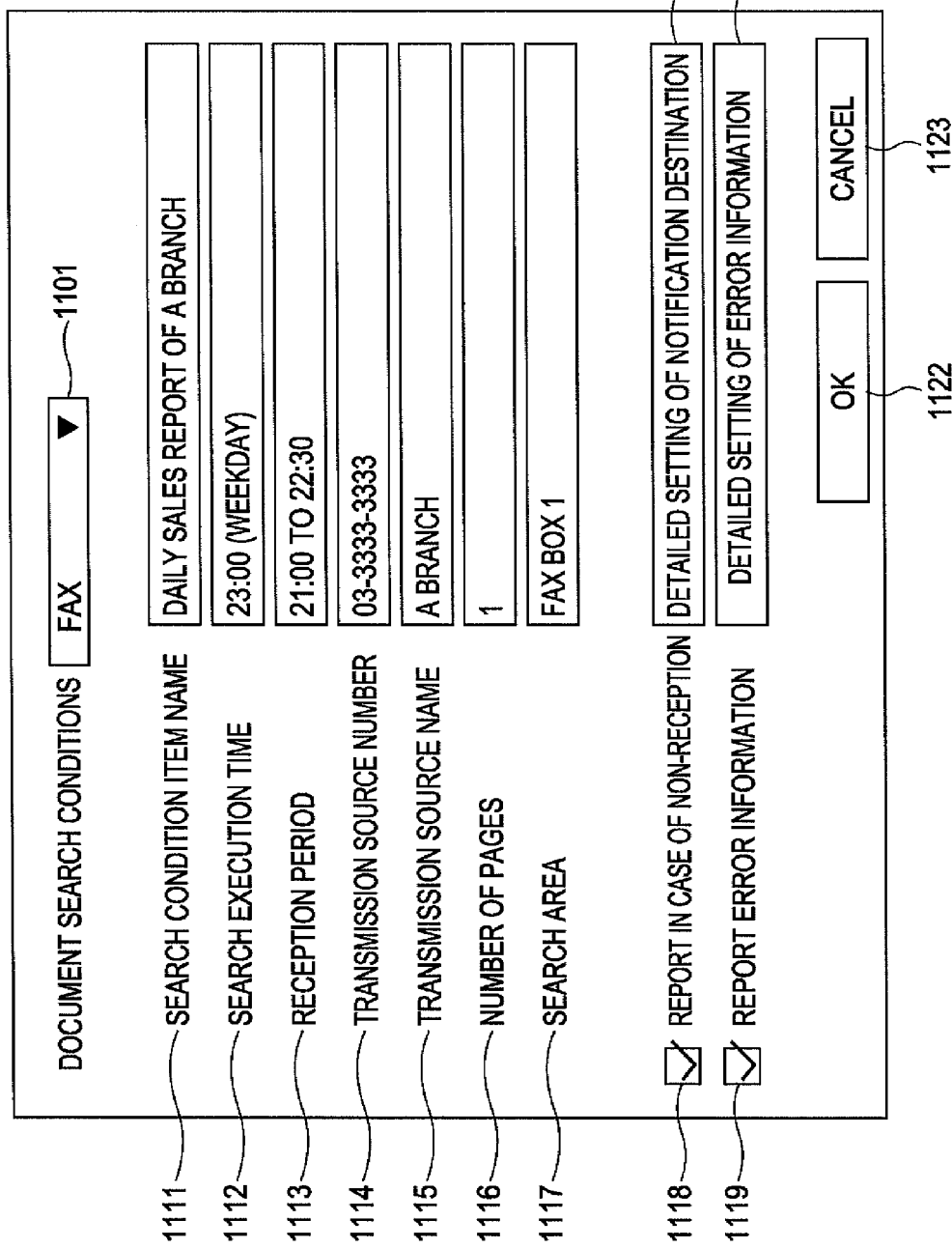
FIG. 11 shows a screen for setting conditions for searching for FAX-received data, the screen being a search conditions setting screen according to an exemplary embodiment of the present invention.

FIG. 11 shows an exemplary search conditions setting screen that is displayed when the detailed display/correction button 1003 or the new registration button 1002 shown in FIG. 10 is depressed, the search conditions setting screen being used to specify conditions for performing a search. When the search conditions setting screen is displayed by depressing the new registration button 1002, each of input items is vacant. When the search conditions setting screen is displayed by depressing the detailed display/correction button 1003, information that has already been input is displayed.

From a reception method selection column 1101, information by which a reception method when data is to be received can be specified can be selected from within a displayed combo box. For example, when the reception of facsimile data is desired to be confirmed, FAX is selected in the reception method selection column 1101. Furthermore, when the reception of data to be received using an Internet facsimile is desired to be confirmed, IFAX is selected in the reception method selection column 1101. As a result of selecting the reception method for receiving data in accordance with a specific protocol and capable of setting the reception method as conditions in the manner described above, ease of use is improved in an apparatus capable of performing data communication by using a plurality of protocols. For the reception method, various methods can be used in addition to FAX and Internet facsimile (electronic mail).

In a search condition item name column 1111, the name of the search conditions can be input. In a search execution time column 1112, the time at which the search for confirming data reception automatically starts can be input. At this time, for the specification of the execution time, a plurality of times may also be input. Furthermore, as shown in FIG. 11, setting may also be performed so that the search execution is repeated only on weekday or on the same day every week. In addition, the execution time may be set individually without performing periodic setting. Furthermore, when setting is performed by making the search execution time column 1112 empty, a search may be performed when an OK button 1122 is depressed by the user. As a result of the above, various business flows can be dealt with.

In a reception period-of-time column 1113, as a reception period of time during which data to be searched for is to be received, a desired time zone can be specified. At this time, as shown in FIG. 11, a time zone may be specified, times may be specified in units of days, such as the third to the fifth, or only one of the beginning and the end of a period can also be specified. For setting the search execution time and the reception period of time, time may be set individually without being set as a periodic schedule like every week or every day.

In a transmission source number column 1114, the telephone number of the transmission source of data to be searched for can be input. In a transmission source name column 1115, the name of the transmission source of data to be searched for can be input. In a number-of-pages column 1116, the number of pages of data to be searched for can be input. From a search area column 1117, a storage area where a search is performed can be selected. At this time, for specifying the storage area, the user box, the system box, and the facsimile box of each user can be specified. As a result, when the number of pages of the data to be received is known, it can be determined whether data for the number of pages has been received, and thus reception determination with higher accuracy can be performed. A single match or plural matches can be specified for the search conditions from the above columns 1101 to 1117 described above.

In check boxes 1118 and 1119, a processing method when the reception of data that matches the search conditions cannot be confirmed when a search is performed can be selected. Examples of processing methods that can be selected include "Prints the result only", "Notify the "notification destination"", and "a report, in which error information of the image processing apparatus is added, is sent to a "notification destination"".

When the check box 1118 is selected, next, a notification destination to which a report is sent as a notification can be set by depressing a notification destination detail setting button 1120. When the check box 1119 is selected, next, an error information detail setting button 1121 can be depressed to perform setting for obtaining error information.

As a result of depressing the OK button 1122, the input conditions setting is stored in the storage area of the setting information, which is indicated by the SRAM 341, and the screen returns to the search conditions list screen shown in FIG. 10, so that the process can shift to the state of standby for performing a search. When a cancel button 1123 is depressed, the setting is cancelled by discarding inputs up to that time, and the process returns to the search conditions list screen shown in FIG. 10.

Figure 12:
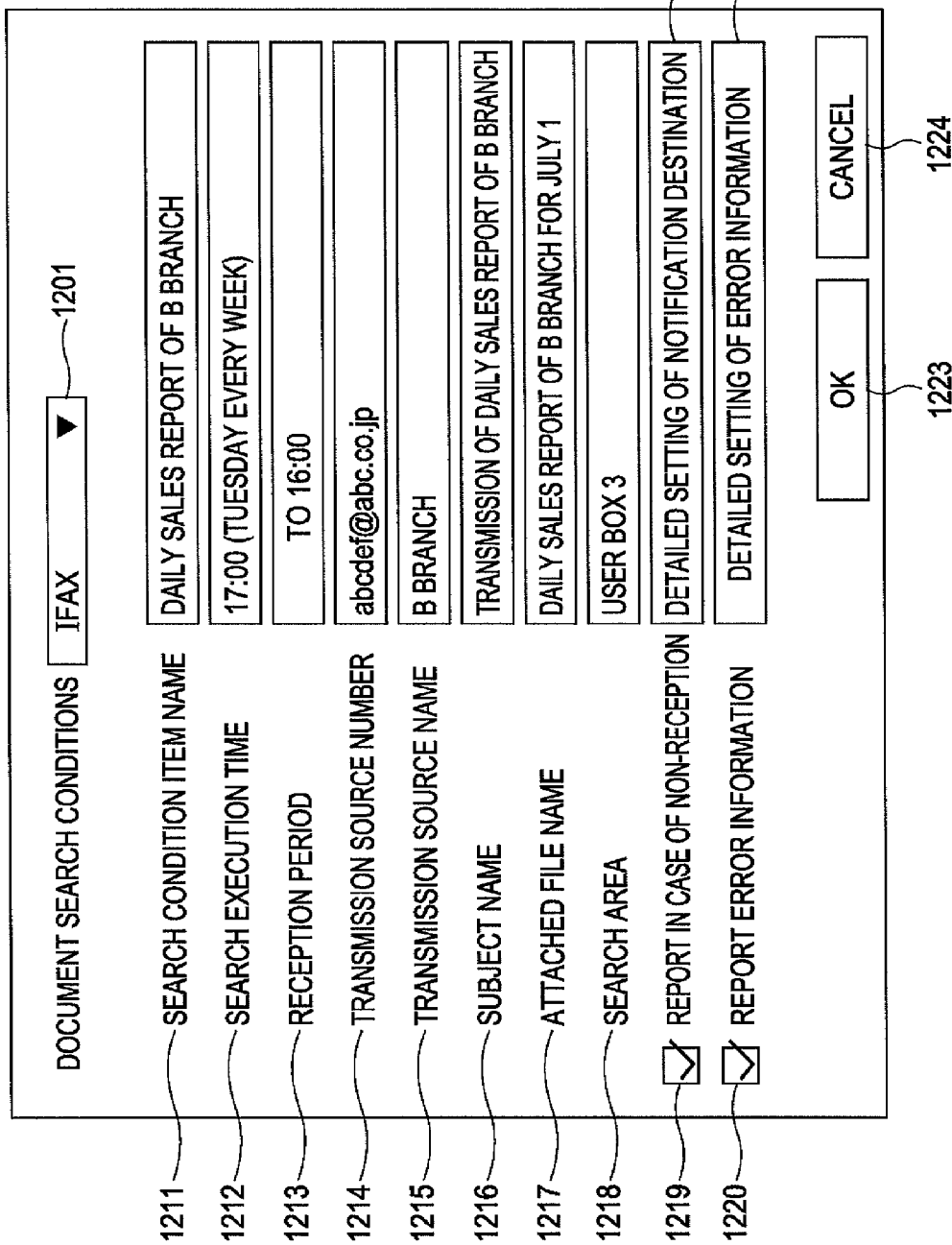
FIG. 12 shows a screen for setting conditions for searching for data received by e-mail, the screen being a search conditions setting screen according to an exemplary embodiment of the present invention.

FIG. 12 shows an example of a search conditions setting screen when IFAX (Internet facsimile) is selected in a reception method selection column 1201. A search condition item name column 1211, a search execution time column 1212, a reception time column 1213, a transmission source name column 1215, a search area column 1218 are identical to those in FIG. 11. Accordingly, descriptions thereof are omitted herein.

In the transmission source number/address column 1214, the address of the transmission source of mail can be input. In a subject name column 1216, the subject name of mail can be input. In an attached file name column 1217, the name of a file attached to the mail can be input. Processing methods 1219 to 1222 when a reception history of data that matches the search conditions cannot be found, an OK button 1223, and a cancel button 1224 are identical to those in FIG. 11. Accordingly, descriptions thereof are omitted herein.

Figure 13:
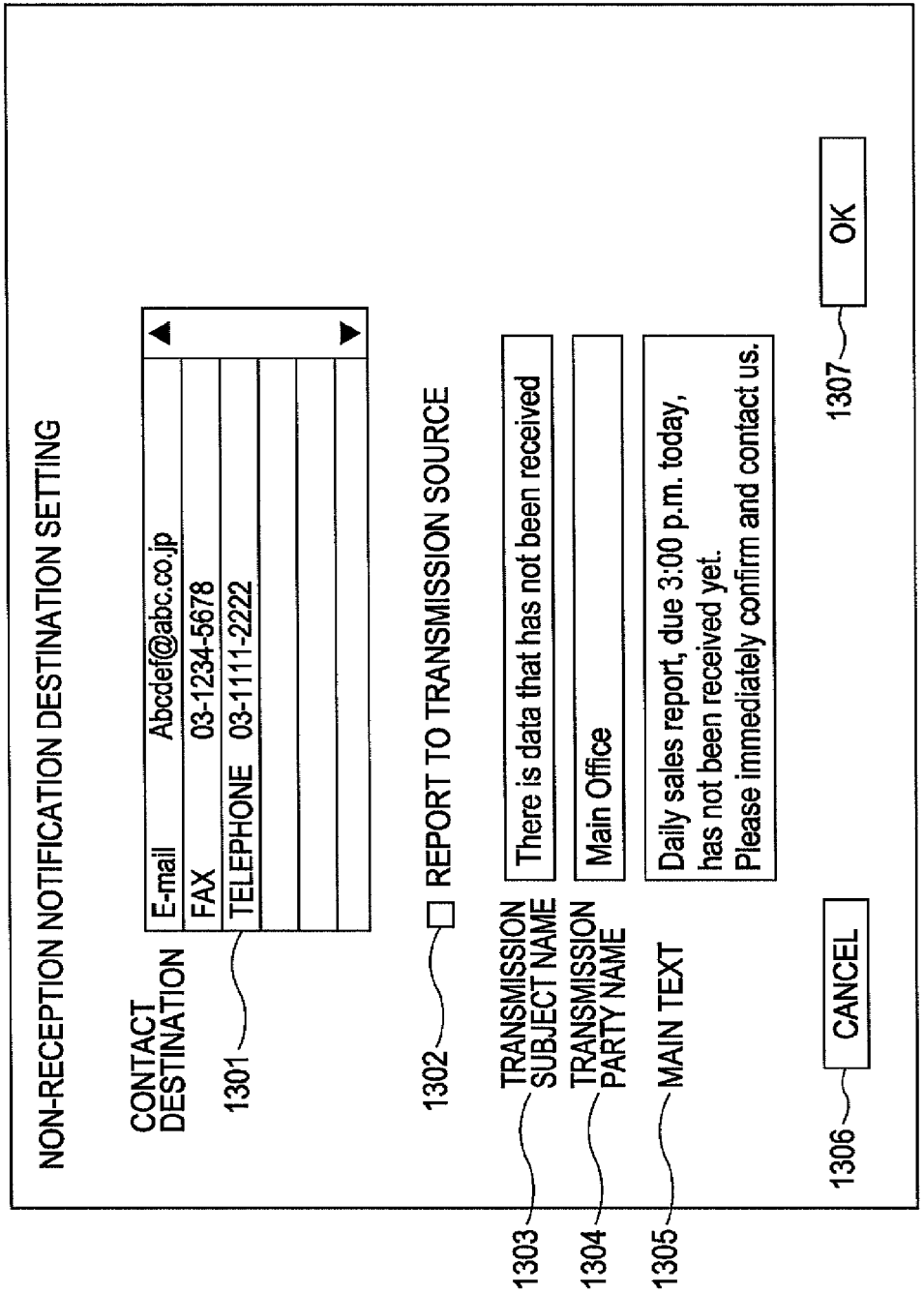
FIG. 13 shows a screen for setting a notification destination in the case of non-reception according to an exemplary embodiment of the present invention.

FIG. 13 shows an exemplary screen for setting a notification destination displayed as a result of depressing the notification destination detail setting button 1120 of FIG. 11. In a notification destination display area 1301, a notification destination when the reception history of the data to be searched for cannot be found can be input. In this area, a plurality of destinations can be registered, for example, destinations for electronic mail, facsimile, IFAX, and the like can be input/registered. This makes it possible to report to a plurality of users, such as a recipient and a transmission person.

A check box 1302 makes it possible to select whether or not, when the mail address and the facsimile number of the transmission source are specified as search conditions, the search result should be automatically reported to the destination thereof. In a transmission subject name column 1303, the calling subject name when a notification is made can be specified. In a caller name column 1304, the name of the transmission person when a notification is made can be specified. In a main body text column 1305, content of main body text body when a notification is made can be specified. As a result, content of a message can be made different according to the user of the notification destination, and a notification of content can be made more appropriately. The main body text body may also be registered for each notification destination.

As a result of depressing an OK button 1306, the conditions setting is determined, and the screen returns to the screen of the search conditions setting of FIG. 11 or 12. When the cancel button 1307 is depressed, the inputs up to that time are discarded to cancel the setting, and the screen returns to the screen of the search conditions setting of FIG. 11 or 12.

Figure 14:
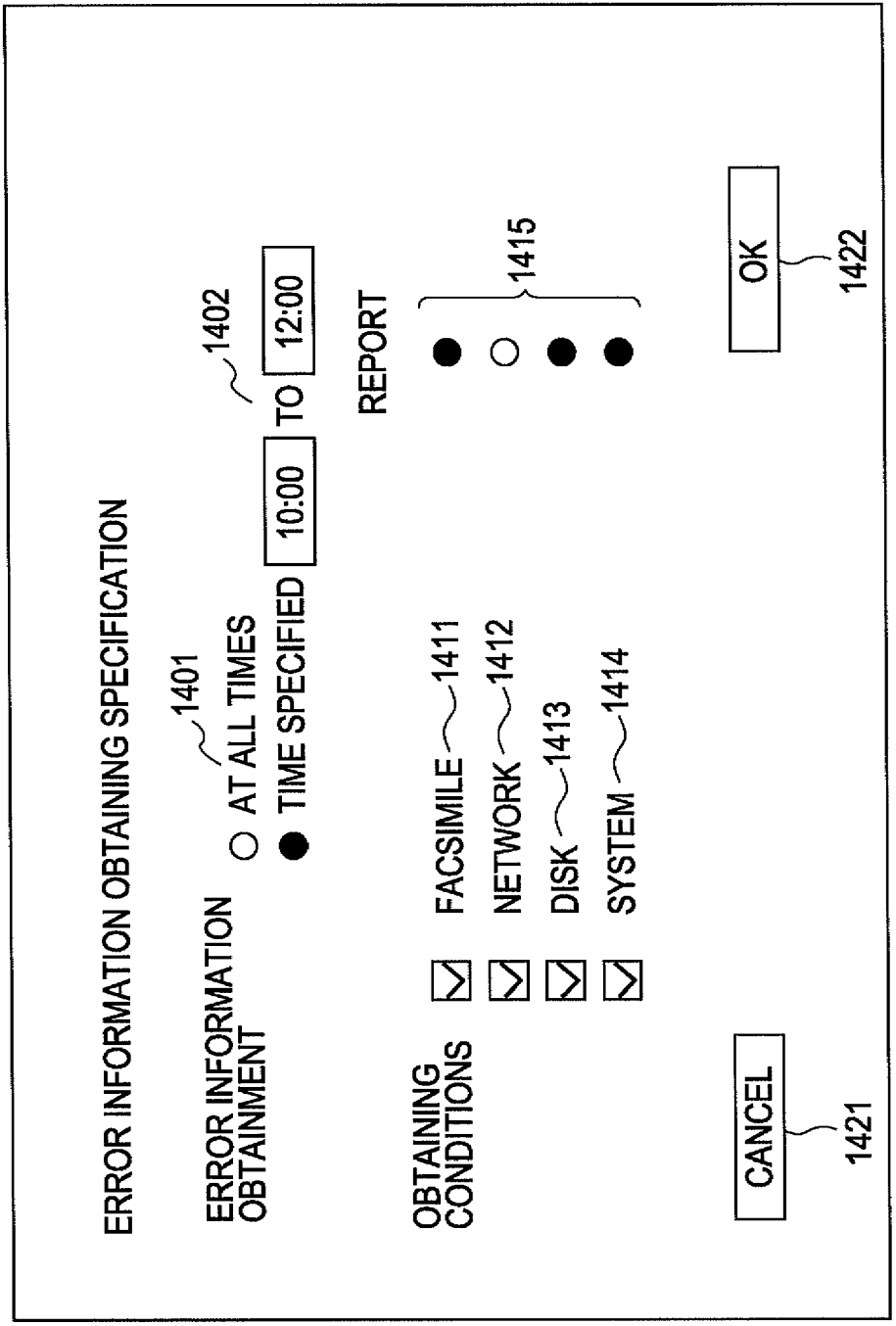
FIG. 14 shows a screen for performing setting on the obtainment of error information according to an exemplary embodiment of the present invention.

FIG. 14 shows an exemplary screen for setting for obtaining error information, which is displayed as a result of depressing the error information detail setting button 1121 of FIG. 11. In obtaining time setting columns 1401 and 1402, a period of time during which error information is obtained can be set. When a radio button 1401 is selected, the log of error information is constantly obtained, and the error information after the expiration of a predetermined time interval is discarded. When the radio button 1402 is selected, error information can be obtained only during a predetermined period of time.

When each check box of the obtaining conditions 1411 to 1414 is selected, the target range in which error information is obtained can be selected. When the obtaining conditions 1411 are selected, an error on the facsimile communication function is obtained. Similarly, hereinafter, when the obtaining conditions 1412 are selected, error information on the network is obtained. When the obtaining conditions 1413 are selected, error information on the disk inside the control device 110 is obtained. When the obtaining conditions 1414 are selected, error information on the entire system is obtained. As a result, memory resources can be effectively used by obtaining only the necessary error information.

In a notification necessity/non-necessity specification column 1415, it is possible to set whether or not a notification should be made according to the content of an error. More specifically, necessity/non-necessity of a notification when the reception of the data to be received cannot be confirmed is specified for each error by selecting the check box. At this time, if the notification destination is changed according to the content of the error, a notification can be made to the user more appropriately.

Next, by depressing an OK button 1422, the setting is determined, and the screen returns to the screen of the search conditions setting of FIG. 11 or 12. When the cancel button 1421 is depressed, the inputs up to that time are discarded, and the process returns to the screen of the search conditions setting of FIG. 11 or 12.

Examples of error information to be obtained include the following. In the case of the facsimile for transmission and reception, a state in which data cannot be transmitted or received due to the telephone line, etc., is being used during a specified period of time, and a case in which the connection with the other party for transmission and reception cannot be normally performed are regarded as an error.

In the case of the network, a case in which the connection with the other party with which data is exchanged by using a network, such as a mail server or a DNS server, cannot be normally performed is regarded as an error.

In the case of the disk, a case in which the available capacity of the data storage area of the image input/output system 100 becomes lost, and new data cannot be stored is regarded as an error.

In the case of the system, a case in which a process for storing received data in a specified area is not performed normally is regarded as an error.

Figure 15:
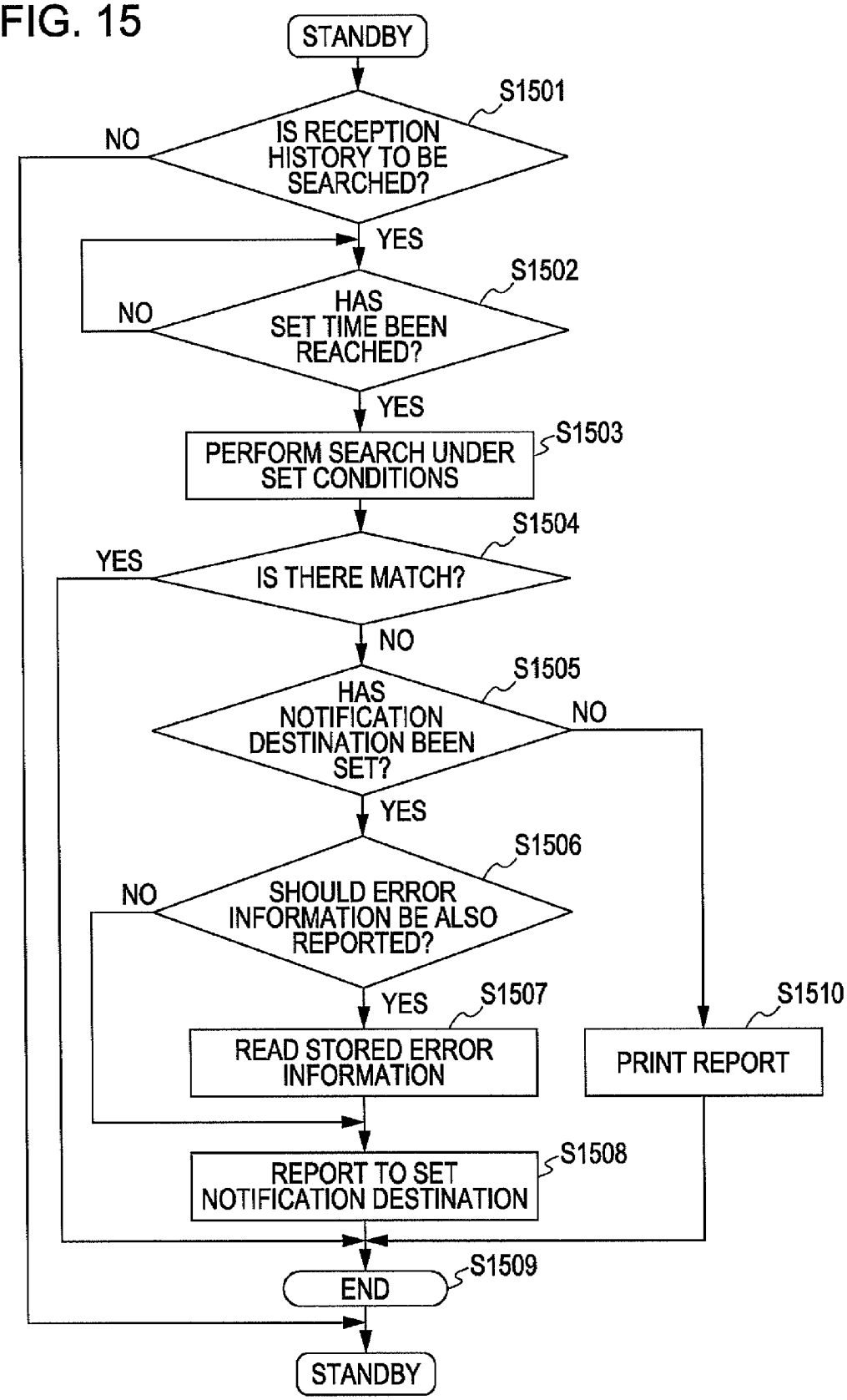
FIG. 15 is a flowchart describing a series of processes for maintaining a data reception history according to an exemplary embodiment of the present invention.

FIG. 15 is a flowchart describing a series of exemplary processes for automatically searching data reception history under the search conditions, which are stored in FIG. 11 to FIG. 14. Control for the series of processes in the flowchart of FIG. 15 is assumed to be performed by the CPU 337 of the control device 110 in accordance with a program stored in the memory 321.

Initially, in S1501, when the image input/output system 100 is in a standby state, it is determined whether or not reception history search has been set. When it has not been set, the image input/output system 100 continues to wait, and if the reception history search has been set, the process proceeds to S1502. In S1502, it is determined whether the time specified under the search conditions has been reached. If the specified time has been reached, a search is performed in S1503. The reception history to be searched is stored, for example, in the form of a table shown in FIG. 16 in the memory 339 inside the control device 110.

FIG. 16 shows an example of a reception history table. Here, a reception time, a transmission source, a transmission source name, an acceptance number, a reception method, a number of pages, and information of reception results are stored in reference numerals 1601 to 1607, respectively. For the management of the reception history, items other than those described above may be stored. Furthermore, tables that differ correspondingly according to the reception method may be provided.

The management of the reception history may not be in the form of a table shown in FIG. 16. Furthermore, the reception history information may be displayed on the operation section 120, or may be managed only within the memory 339. Alternatively, an external apparatus, such as a management server, may manage the reception history.

On the basis of the results of the search performed in S1503, it is determined whether data matching the set search conditions has been received. If the data has been received, the process ends directly in S1509. In this case, a notification of having received the data may be made to the destination that is specified in advance. When there is no reception history of the data matching the search conditions in S1504, the process proceeds to S1505, where it is determined whether the notification destination has been set. At this time, if the notification destination has not been set, the process proceeds to S1510, where a report of the search result is printed from the printer device 140.

If it is determined in S1505 that the notification destination has been set, the process proceeds to S1506, where it is determined whether or not setting of notifying error information has also been performed. If setting of notifying error information has been performed, the process proceeds to S1508, where the fact that data has not been received is reported to the set notification destination, and the process ends in S1509.

If it is determined in S1506 that setting of reporting error information has also been performed, next, in S1507, the obtained error information is read, and the error information, together with the corresponding error information, is reported to the set notification destination (S1508). Here, as a result of notifying the error information, the user to whom a notification has been made can know the cause why, in spite of the fact that the transmission person has performed the transmission operation, the recipient side has not received the data. For the notification in S1508 and the report in S1510, the subject name, the caller name, and the main body text, which are set in FIG. 13, are used.

Figure 17:
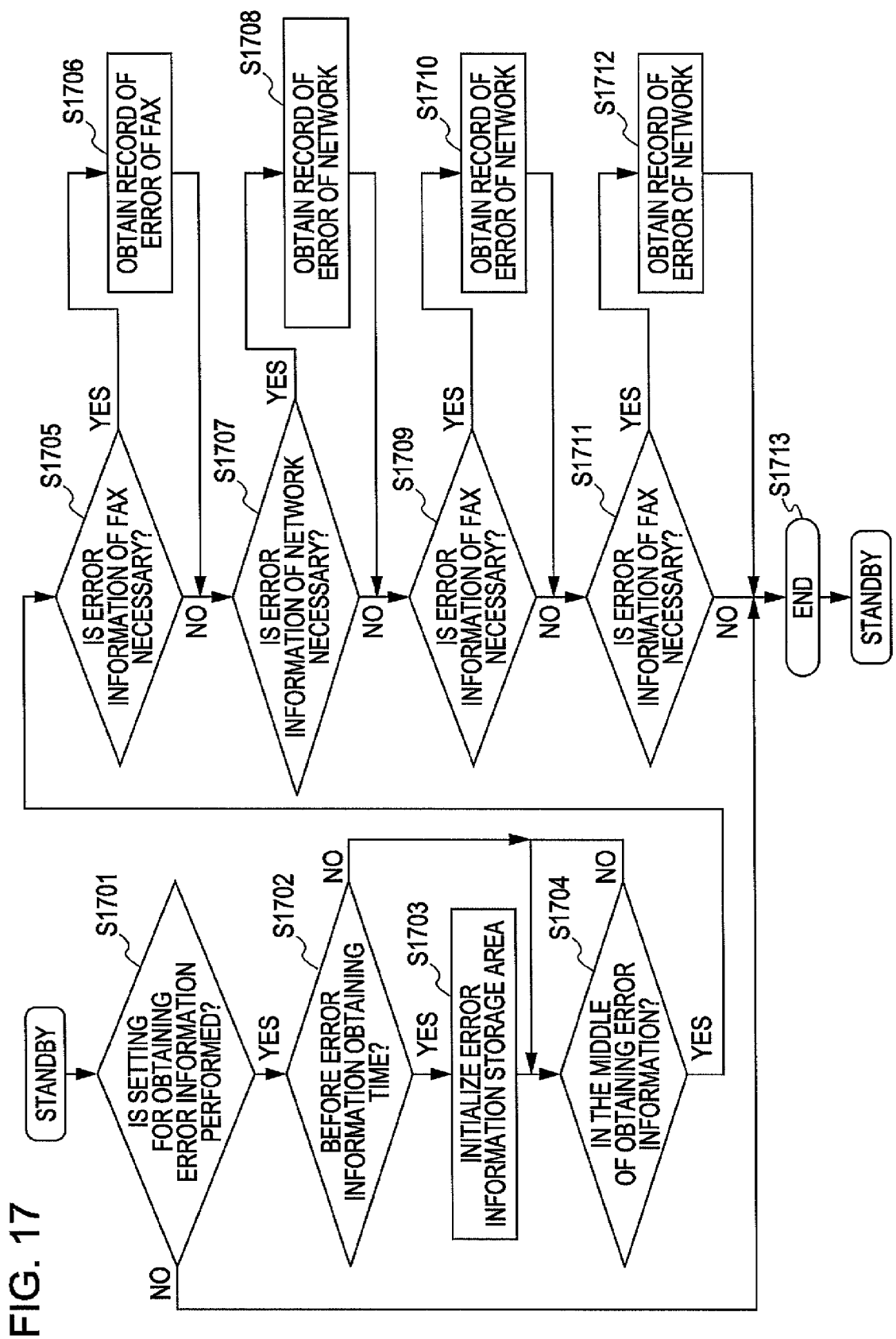
FIG. 17 is a flowchart describing a series of processes for obtaining error information according to an exemplary embodiment of the present invention.

FIG. 17 is a flowchart describing a series of exemplary processes for obtaining error information. Control for the series of processes in the flowchart of FIG. 17 is assumed to be performed by the CPU 337 of the control device 110 in accordance with a program stored in the memory 321. Obtaining of the error information is performed on the basis of conditions set in obtaining conditions 1411 to 1414 in a period of time specified in the obtaining time setting columns 1401 and 1402 of FIG. 14.

When it is determined in S1701 that obtaining error information has been set, the mode is switched to a mode for obtaining error information. If obtaining error information has not been set, the process ends and returns to a standby state. Next, it is determined in S1702 whether or not the time is before the set obtaining time. If the time is before the set obtaining time, the process proceeds to S1703, where the error information storage area is initialized. If it is determined in S1702 that the time is not before the set obtaining time, it is determined in S1704 whether the time is in the middle of obtaining error information. If the time is in the middle of obtaining error information, the process proceeds to S1705.

In S1705, it is determined whether obtainment of error information of the facsimile has been specified. If obtainment of error information of the facsimile has been specified, the process proceeds to S1706, where error information is obtained. If the obtainment of error information has not been specified, the process proceeds to S1707. Similarly, in S1707 to S1712, error information that has been specified to be obtained in respective steps is obtained. Finally, in S1713, the process ends and returns to a standby state again.

Up to this point, an embodiment in which the reception history is searched has been described. The received data itself stored in a box may also be searched for by using search conditions set in FIG. 11 or FIG. 12. As a result, since there is no need to manage the reception history, the cost of the apparatus can be reduced.

In addition, when the reception history of the data matching the search conditions is found as a result of performing the search, the corresponding reception data may be printed or transferred. As a result, since the search result can be reflected immediately on the next operation in addition to only making a notification, the operation efficiency is improved.

Second Exemplary Embodiment

Next, a description will be given of a function for making a notification when a request for transmitting data is made to another party connected via a network, and the other party is not in a state of capable of transmitting the corresponding data. The basic configuration in the second embodiment is identical to that of the first embodiment. Accordingly, a description thereof is omitted herein. However, in the overall configuration of FIG. 1, more preferably, a connection with an external server and a storage device provided in another system is made via the LAN 150.

The differences between the first embodiment and the second embodiment are as follows. In the first embodiment, a determination is made as to data that should be transmitted from the transmission source, whereas in the second embodiment, a determination is made as to data for which a request for transmission is made to the transmission source. As a result, it is possible for the user to easily know the fact that data for transmission has not been ready on the transmission side.

With reference to FIG. 18 to FIG. 21, a description will be given of an example of a function for making a transmission request to the other party by using polling reception of a G3 facsimile. The polling communication is a function in which the reception side calls the transmission side by the communication procedure of a G3 facsimile in order to request the transmission side to transmit facsimile data. Furthermore, in secret polling communication, initially, the transmission side stores facsimile data for polling transmission, to which a password for accessing the facsimile data is attached. The function is known such that, thereafter, when there is a polling transmission request from a receiver, data is transmitted after verifying the password transmitted from the receiver.

FIG. 18 shows an exemplary polling reception setting screen for performing various kinds of setting for performing polling reception. In an other party's number column 1810, the telephone number of the other party that performs polling reception is input. In a password column 1820, when secret polling reception is to be performed, a password for reception, which is set in advance on the transmission side, is input.

When polling reception is to be automatically performed by using a timer, it is possible to specify a time and a time interval. When the time at which automatic polling reception is to be performed is specified, the radio button of a time specification column 1830 is selected, and furthermore a set time is input. At this time, a plurality of times may also be set. When the automatic polling reception is to be performed repeatedly every day at the set time, the check box of a repeated-every-day setting 1831 is selected. At this time, setting, such as only weekdays or only the 25th day every month, may also be performed.

When the automatic polling reception is to be performed at a fixed time interval, the radio button of a time specification 1840 is selected. Furthermore, when a desired time interval is selected from within a subsequent time interval choice 1841 and an OK button 1870 is depressed, automatic polling reception is performed every time interval selected by reckoning from the time of the depression. When the automatic polling reception is not to be performed using a timer, no timer 1850 is selected, and the OK button 1870 is depressed. Then, immediately, polling reception is started. Further a cancel button is 1880 is provided to cancel the polling reception setting operation if desired.

When the polling reception is to be performed, a polling transmission request is made to the transmission side. In order that a notification is made to a predetermined user when the transmission side connect transmit desired data, a check box 1860 is selected. Examples of possible cases in which transmission is not possible include a case in which desired data is not ready for polling transmission, a case in which the other party side does not have a polling function, and a case in which the transmission function of the transmission side is in an error state.

In a report column 1860 when data does not exist, a mail address, a telephone number, a facsimile number, and the like can be input as a notification destination to which a notification is made, and a notification is made by using electronic mail transmission, telephone calling, and facsimile transmission, respectively.

When a notification is to be made to the other party for polling reception, if a check box 1861 is selected in advance, predetermined facsimile data is automatically transmitted to the other party when the desired data does not exist. As a result, for example, since a print describing notification content is output in the other party which should transmit polling data, it is possible for the user who should perform transmission to easily know the fact that particular data has not yet been transmitted.

Here, when a notification is to be made by transmitting facsimile data in the manner described above, in a session that is established by a procedure of first performing polling reception, a terminal on the polling reception side (the side on which a request has been made) can transmit facsimile data for notification.

Figure 20:
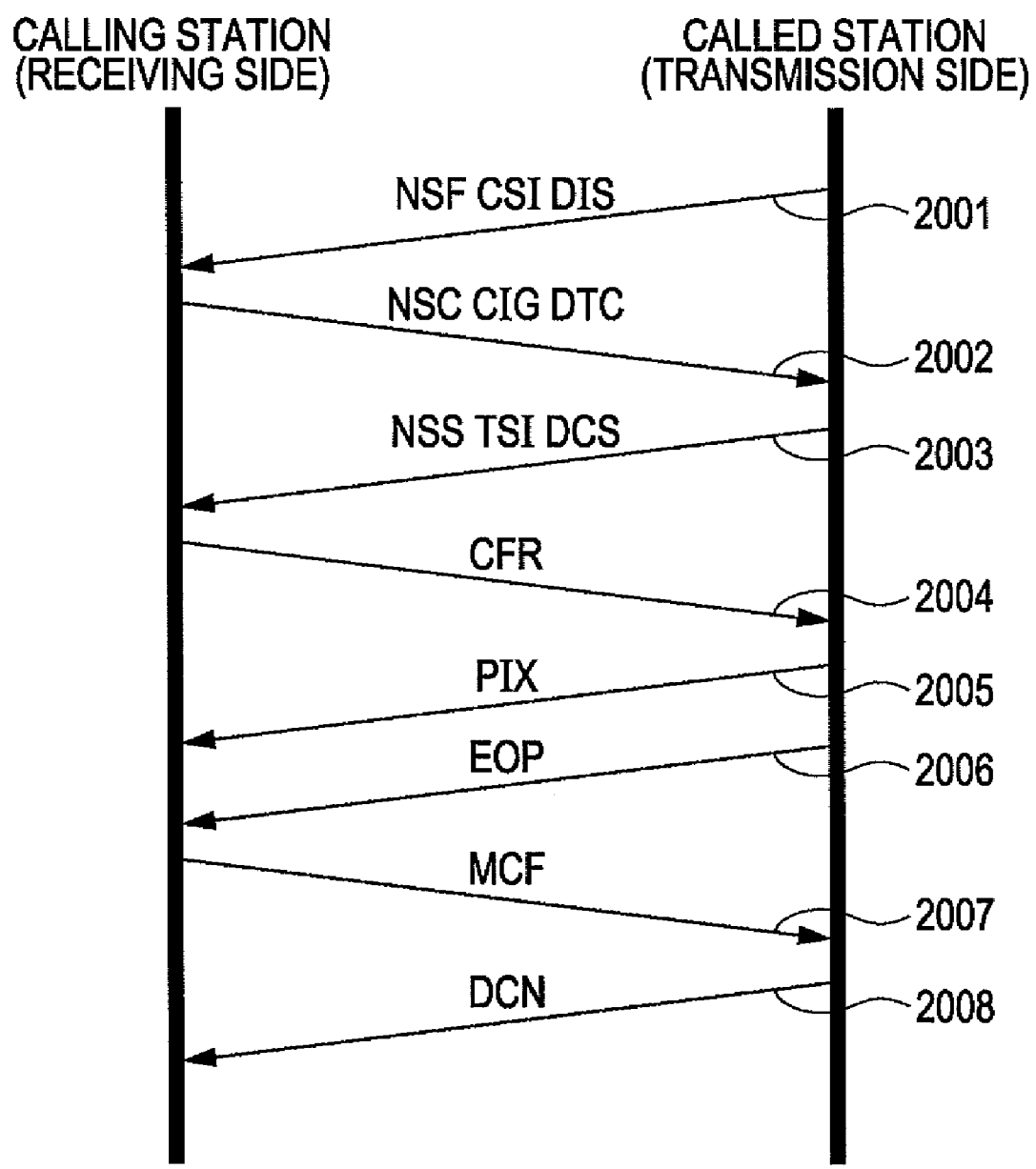
FIG. 20 shows a procedure signal in the ITU-T recommendation T.30 according to an exemplary embodiment of the present invention.

More specifically, in the command shown in FIG. 20, the calling station (polling reception side) is notified of the fact that the requested data cannot be transmitted by means of a digital identification signal (DIS) indicated at a signal 2001 from the called station (polling transmission side). At this time, as a result of outputting a digital command signal (DCS) in place of a digital transmit command (DTC) signal shown in FIG. 20 at a signal 2002 from the calling station (polling reception side), facsimile data for notification in this embodiment can be transmitted with transmission and reception being reversed.

As described above, the transmission of the facsimile data for notification may be performed in the same session as in the polling communication with transmission and reception being reversed, and may be performed after the session of the polling communication is completed once. That is, facsimile data may be transmitted by newly making a call from the calling station (polling reception side).

Figure 19:
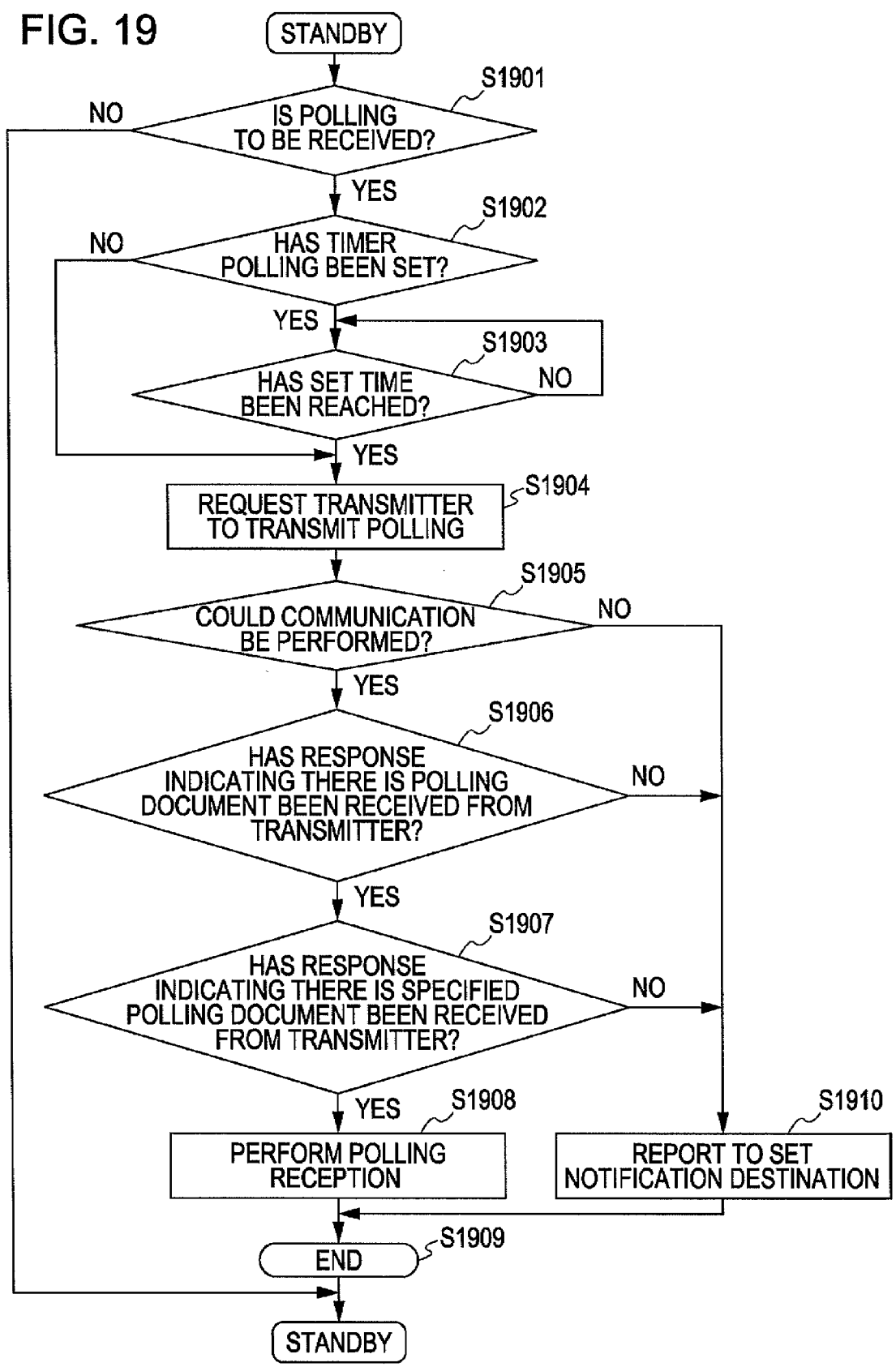
FIG. 19 is a flowchart describing a series of processes for performing polling reception according to an exemplary embodiment of the present invention.

FIG. 19 shows a flowchart describing a series of exemplary processes for performing polling reception. Control of a series of operations in this flowchart is assumed to be performed by the CPU 337 of the control device 110 in accordance with a program stored in the memory 321. Initially, in S1901, a determination is made in the standby state as to whether there is input for instructing the polling reception in the operation section 120. When there is input, the process proceeds to the subsequent S1902, where it is determined whether or not the input is a timer polling. When it is NO in S1901, the process continues waiting.

When it is determined in S1902 that timer polling has been set, it is determined in the subsequent S1903 whether the timer set time has been reached. When it is determined in S1902 that timer polling has not been set, the process directly proceeds to S1904.

Next, by making a call to the other party (the side that transmits polling data) set in S1904, a polling transmission request is made. FIG. 20 shows a procedure signal in ITU.T30 as a detailed example of a control procedure in a transmission request.

As indicated by a signal 2001 of FIG. 20, when a call is received from the calling station (the data input/output system 100), the called station transmits non-standard facilities (NSF), CSI, and DIS signals. Then, at this time, in the information field within the DIS signal, "there is a document to be transmitted" is declared. The calling station receiving this signal transmits a polling request by transmitting non-standard facilities command (NSC), CIG, and DTC signals by using a signal 2002. The called station receiving this request transmits non-standard facilities set-up (NSS), TSI, and DCS signals by using a signal 2003.

Next, after a CFR (Confirmation to Receive) signal of the calling station is recognized by a signal 2004, an image signal (PIX) is transmitted by a signal 2005. When the transmission of the image signal (PIX) is completed, the process ends by performing a series of post procedure signals utilizing an end of procedure (EOP) 2006 signal, an MCF 2007 signal, and a DCN signal 2008.

Referring back to the flowchart in FIG. 19, in S1905 to S1907, on the basis of a control signal of FIG. 20, it is determined whether or not the process is in a state in which polling reception can be performed. More specifically, in S1905, it is determined whether or not communication with the facsimile apparatus of the other party could be performed. Next, in S1906, it is determined whether there is data for polling transmission in the transmitter. Next, in S1907, it is determined whether there is desired data in the transmitter in the case of secret polling reception. In the case of not being secret polling communication, the process proceeds from S1906 to S1908. When it is determined that polling reception is possible, in S1908, the polling reception is performed, and the process ends at S1909.

In the case of NO in one of S1905 to S1907, the process proceeds to S1910 before the process ends at S1909, where a notification is made to the set notification destination. FIG. 21 shows an example of a facsimile image that is to be notified. In the report content, as shown in FIG. 21, on the basis of S1905 to S1907, error factors why the document could not be received may be described. The report method may be electronic mail or telephone calling in addition to a facsimile. Furthermore, also when the reception is completed normally, a notification may be made.

In the foregoing, in the second embodiment, the polling reception of a facsimile has been described as a specific example. Application examples of the second embodiment are not limited to the polling reception of a facsimile, and the second embodiment can be used when data is to be received from another apparatus on the network. More specifically, the second embodiment can be applied to cases in which the transmission side transmits data in response to a request from the reception side, such as a case in which a request is made to an external database so as to transfer data and a case in which received mail is transferred to a mail server.

As has thus been described, in the second embodiment, rather than searching for data that must have already been received, a check can be made as to whether or not there is data that should be received from now. When there is no data that should be received, since the other party can be notified of the fact, it is possible to allow the other party to prompt preparation of data. It is also possible to combine the process of the first embodiment and the process of the second embodiment as appropriate.

The present invention can be achieved by supplying a storage medium (or a recording medium) recording software program code that achieves the functions of the above-described embodiments to a system or an apparatus and by enabling a computer (or a CPU or an MPU) of the system or apparatus to read the program code stored in the storage medium and to execute the program code. In this case, the program code itself read out of the storage medium realizes the functions of the above-described embodiments and the storage medium storing the program code can realize the present invention. Also, in addition to the functions of the above-described embodiments being realized by the program code read out being executed on a computer, the functions of the above-described embodiments may be realized by the operating system (OS) running on the computer performing part or all of the actual processing based on instructions of the program code.

Moreover, the functions of the above-described embodiments may be realized in such a manner that the program code read out from the storage medium is written to memory provided to a function expansion board inserted to the computer or a function expansion unit connected to the computer and thereafter, the CPU provided in that function expansion board or in that function expansion unit performs part or all of the actual processing based on instructions of the program code.

As has thus been described, according to the present invention, when data that should be received has not been received, non-reception information can be appropriately reported to the user.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions. This application claims the priority of Japanese Application No. 2005-280104 filed Sep. 27, 2005, which is hereby incorporated by reference herein in its entirety.

What is claimed:

1. A data communication apparatus connected to a plurality of transmission sources, the apparatus comprising:
   a reception unit configured to receive data from the plurality of transmission sources;
   an input unit configured to input at least transmission source specification information for specifying one of the plurality of transmission sources which is supposed to transmit expected data and reception period-of time specification information for specifying a period of time during which the expected data should be received, as conditions for specifying the expected data from among data received by the reception unit;
   a determination unit configured to determine whether or not the reception unit has received the expected data satisfying the conditions input by the input unit; and
   a notification unit configured to automatically transmit a message indicating that the expected data has not been received to the transmission source which is supposed to transmit the expected data and specified by referring the transmission source specification information input by the input unit as the conditions, in a case where the determination unit determines that the reception unit has not received the expected data satisfying the conditions.

2. The data communication apparatus according to claim 1, wherein the input unit is further configured for inputting timing specification information for specifying a time at which the determination unit performs the determination, and the determination unit performs the determination at a time that the timing specification information indicates.

3. The data communication apparatus according to claim 1, wherein the reception unit is configured to receive data by using one of a plurality of different protocols for performing data communication, and the input unit is configured for inputting, as the conditions, communication method specification information for specifying which one of the plurality of different protocols is used for receiving the expected data.

4. The data communication apparatus according to claim 1, further comprising an output unit configured to output reception information indicating that the reception unit has received the expected data when the reception unit has received the expected data satisfying the conditions.

5. The data communication apparatus according to claim 1, further comprising a management unit configured to manage the reception history of the data received by the reception unit,
   wherein the determination unit performs the determination on the basis of whether or not there is a history indicating that the expected data satisfying the conditions has been received within the reception history managed by the management unit.

6. The data communication apparatus according to claim 1, further comprising a registration unit configured to register the conditions input by the input unit, wherein the registration unit is configured to register a plurality of sets of the conditions input by the input unit.

7. The data communication apparatus according to claim 1, further comprising an error detection unit configured to detect the presence or absence of an error regarding the data communication apparatus, wherein, when the reception unit has not received the expected data satisfying the conditions input by the input unit, the notification unit notifies the transmission source specified by the transmission source specification information of the error detected by the error detection unit.

8. The data communication apparatus according to claim 1, wherein the notification unit determines whether or not to perform the notification on the basis of the content of the error detected by the error detection unit.

9. A data communication apparatus connected to a plurality of transmission sources comprising:

a reception unit configured to receive data from the plurality of transmission sources;

an input unit configured to input at least transmission source specification information for specifying one of the plurality of transmission sources which is supposed to transmit expected data as conditions for specifying the expected data from among data received by the reception unit;

a transmission request unit configured to request the transmission source specified by the transmission source specification information input by the input unit to transmit the expected data; and a notification unit configured to automatically transmit a message indicating that the expected data has not been received to the transmission source which is supposed to transmit the expected data and specified by referring the transmission source specification information input by the input unit as the conditions, in a case where the transmission source is not in a state capable of transmitting the expected data.

10. The data communication apparatus according to claim 9, wherein the input unit is further configured for inputting request time specification information for specifying a time at which the transmission request unit makes the transmission request, and the transmission request unit makes the transmission request at a time that the request time specification information indicates.

11. The data communication apparatus according to claim 9, wherein the input unit is further configured for inputting storage area specification information for specifying a storage area in the transmission source, in which the expected data should be stored, as the conditions.

12. The data communication apparatus according to claim 9, wherein the data communication apparatus is a facsimile apparatus for transmitting and receiving facsimile data in accordance with a facsimile protocol, and the transmission request unit makes the transmission request to the transmission source by using a polling function for making the transmission request by calling the transmission source of the facsimile data.

13. The data communication apparatus according to claim 9, wherein the notification unit performs the notification by transmitting predetermined facsimile data to the transmission source.

14. The data communication apparatus according to claim 13, wherein the predetermined facsimile data including information indicating that the expected data corresponding to the conditions has not been input for polling transmission in the transmission source.

15. A data communication method utilized in a data communication apparatus connected to a plurality of transmission sources, the method comprising:

via a reception unit, receiving data from the plurality of transmission sources;

via an input unit, inputting at least transmission source specification information for specifying one of the plurality of transmission sources which is supposed to transmit expected data and reception period-of-time specification information for specifying a period of time during which the expected data should be received, as conditions for specifying the expected data from among data received by the reception unit;

via a determination unit, determining whether or not the expected data satisfying the input conditions has been received; and via a notification unit, automatically transmitting a message indicating that the expected data has not been received to the transmission source which is supposed to transmit the expected data and specified by referring the transmission source specification information input as the conditions, in a case where the determination unit determines that the expected data satisfying the conditions has not been received.

16. A data communication method utilized in a data communication apparatus connected to a plurality of transmission sources, the method comprising:

via a reception unit, receiving data from the plurality of transmission sources;

via an input unit, inputting at least transmission source specification information for specifying one of the plurality of transmission sources which is supposed to transmit expected data as conditions for specifying the expected data from among data received by the reception unit;

requesting the transmission source specified by the transmission source specification information to transmit the expected data; and via a notification unit, automatically transmitting a message indicating that the expected data has not been received to the transmission source, which is supposed to transmit the expected data and specified by referring the transmission source specification information input as the conditions, in a case where the transmission source is not in a state of capable of transmitting the expected data.

17. A computer readable storage medium utilized in a data communication apparatus connected to a plurality of transmission sources, the recording medium comprising:

computer-executable instructions for receiving data from the plurality of transmission sources;

computer-executable instructions for inputting at least transmission source specification information for specifying one of the plurality of transmission sources which is supposed to transmit expected data and reception period-of-time specification information for specifying a period of time during which the expected data should be received, as conditions for specifying the expected data from among received data;

computer-executable instructions for determining whether or not the expected data satisfying the input conditions has been received; and computer-executable instructions for automatically transmitting a message indicating that the expected data has not been received to the transmission source which is supposed to transmit the expected data, and specified by referring the transmission source specification information input as the conditions, in a case where the determination determines that the expected data satisfying the conditions has not been received.

18. A computer readable storage medium utilized in a data communication apparatus connected to a plurality of transmission sources, the recording medium comprising:

computer-executable instructions for receiving data from the plurality of transmission sources;

computer-executable instructions for inputting at least transmission source specification information for specifying one of the plurality of transmission sources which is supposed to transmit expected data as conditions for specifying the expected data from among received data;

computer-executable instructions for requesting the transmission source specified by the transmission source specification information to transmit the expected data; and computer-executable instructions for automatically transmitting a message indicating that the expected data has not been received to the transmission source which is supposed to transmit the expected data and specified by referring the transmission source specification information input as the conditions, in a case where the transmission source is not in a state capable of transmitting the expected data.

* * * * *